US012632216B2

(12) United States Patent
Dong et al.

(10) Patent No.: US 12,632,216 B2
(45) Date of Patent: May 19, 2026

(54) DISTRIBUTED AUDIO PLAYING METHOD AND ELECTRONIC DEVICE

(71) Applicant: Huawei Technologies Co., Ltd., Shenzhen (CN)

(72) Inventors: Ganggang Dong, Wuhan (CN); Binfei Li, Shenzhen (CN); Hongjiang Li, Shenzhen (CN); Meng Song, Shenzhen (CN); Xiong Zhuang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 264 days.

(21) Appl. No.: 18/547,985

(22) PCT Filed: Dec. 21, 2021

(86) PCT No.: PCT/CN2021/140181
§ 371 (c)(1),
(2) Date: Aug. 25, 2023

(87) PCT Pub. No.: WO2022/179273
PCT Pub. Date: Sep. 1, 2022

(65) Prior Publication Data
US 2024/0126505 A1     Apr. 18, 2024

(30) Foreign Application Priority Data
Feb. 28, 2021    (CN) .......................... 202110222215.8

(51) Int. Cl.
*G06F 3/16* (2006.01)
*G06F 3/04845* (2022.01)
*G06F 3/0486* (2013.01)
*G06F 3/14* (2006.01)

(52) U.S. Cl.
CPC .......... *G06F 3/167* (2013.01); *G06F 3/04845* (2013.01); *G06F 3/0486* (2013.01); *G06F 3/1446* (2013.01); *G06F 3/165* (2013.01)

(58) Field of Classification Search
None
See application file for complete search history.

(56) References Cited

U.S. PATENT DOCUMENTS

| | | | |
|---|---|---|---|
| 2007/0124503 A1 | 5/2007 | Ramos et al. | |
| 2008/0288876 A1* | 11/2008 | Fleming ................. | G06F 3/167 |
| | | | 715/761 |
| 2014/0316543 A1* | 10/2014 | Sharma ................. | G06F 3/1454 |
| | | | 700/94 |
| 2020/0310743 A1* | 10/2020 | Nicholson ............. | G06F 3/0484 |

FOREIGN PATENT DOCUMENTS

| | | |
|---|---|---|
| CN | 104137048 A | 11/2014 |
| CN | 109660842 A | 4/2019 |
| CN | 110383234 A | 10/2019 |
| CN | 111913628 A | 11/2020 |
| CN | 112083867 A | 12/2020 |

* cited by examiner

*Primary Examiner* — Irete F Ehichioya
*Assistant Examiner* — Samuel Shen
(74) *Attorney, Agent, or Firm* — Conley Rose, P.C.

(57) ABSTRACT

A distributed audio playing method applied to a first device and a second device includes that an audio corresponding to an application window in the first device is adaptively configured and played between the first device and the second device based on a position of the application window.

20 Claims, 14 Drawing Sheets

Device A Device B (a)

Device A Device B (b)

DISTRIBUTED AUDIO PLAYING METHOD AND ELECTRONIC DEVICE

CROSS-REFERENCE TO RELATED APPLICATIONS

This application is a U.S. National Stage of International Patent Application No. PCT/CN2021/140181 filed on Dec. 21, 2021, which claims priority to Chinese Patent Application No. 202110222215.8 filed on Feb. 28, 2021, both of which are hereby incorporated by reference in their entireties.

TECHNICAL FIELD

Embodiments of this application relate to the field of electronic technologies, and in particular, to a distributed audio playing method and an electronic device.

BACKGROUND

As terminal technologies and display technologies develop, multi-device distributed display brings more convenience to people's life. The multi-device distributed display means that interface display is implemented by using a plurality of electronic devices. For example, extended display of an application interface may be implemented by using a plurality of electronic devices.

For example, (a) in FIG. 1 shows a scenario in which a device B and a device A display an interface through cross-device distribution in a splicing manner. As shown in (a) in FIG. 1, an interface a1 is displayed on a display of the device A, and an interface a2 is displayed on a display of the device B. The interface a1 and the interface a2 are two parts that form an interface a from a geometric angle. Still as shown in (b) in FIG. 1, an interface a displayed on the device A is displayed on the device B in an extended manner. After extended display, the interface a is transferred from the device A to the device B and displayed on the device B. In some scenarios, for example, in a scenario in which an interface on the device A is displayed on the device B in an extended manner by dragging the interface, a display process of the interface on the device A and the device B usually includes the scenario shown in (a) in FIG. 1 to the scenario shown in (b) in FIG. 1. In the scenario shown in (a) in FIG. 1 or (b) in FIG. 1, the device A is usually referred to as a primary device, and the device B is usually referred to as an extended device or a secondary device.

When an interface is displayed on a plurality of devices in a distributed manner, a user usually needs to manually switch an audio playing device, to switch audio to an extended device. This method is complex for the user, and user experience is poor. In addition, the method cannot implement adaptive switching of audio with a distributed display status of an interface. For example, in the extended display scenario shown in (a) in FIG. 1, proper audio switching cannot be implemented according to a conventional method.

SUMMARY

Embodiments of this application provide a distributed audio playing method and an electronic device. The method may be applied to a first device and a second device. Audio corresponding to a window in the first device may be adaptively allocated and played between the first device and the second device based on a position of the window. This improves audio use experience of a user when the user uses a plurality of devices.

According to a first aspect, this application provides a distributed audio playing method. A first device displays a first application window, and the first device plays first audio corresponding to the first application window. The first device displays a first part of the first application window in response to a first user operation, and a second device receives video data sent by the first device, and displays a second part of the first application window based on the video data. In this case, the first device plays the first audio, and the second device plays the first audio. In response to a second user operation, the second device receives the video data sent by the first device, and displays the first application window based on the video data. In this case, the second device plays the first audio.

In a possible design, the first device monitors a position of the first application window in a display area corresponding to the first device, and determines, based on the position of the first application window, whether to send the video data to the second device. When the first application window is in the display area corresponding to the first device, the video data is not sent to the second device. When the first part of the first application window is in the display area corresponding to the first device, and the second part of the first application window is in a display area corresponding to the second device, the video data is sent to the second device. When the first application window is in the display area corresponding to the second device, the video data is sent to the second device.

In a possible design, when an audio state of the first application window is playing, the first device sends the first audio to the second device. When the audio state of the first application window is at least one of states including pause, mute, and exit, the first audio is not sent to the second device.

In a possible design, the first device and the second device play the first audio at same volume.

In a possible design, the first device plays the first audio at first volume, and the second device plays the first audio at second volume. The first volume and the second volume are obtained by the first device based on the position of the first application window.

In a possible design, the first device obtains, from an audio session list based on an identifier of the first application window, an audio stream associated with the first application window, and generates the first audio based on the audio stream associated with the first application window.

In a possible design, the identifier of the first application window includes at least one of a window identifier, a browser identifier, and a path.

In a possible design, a first application corresponding to the first application window runs on the first device.

In a possible design, the first user operation and the second user operation are operations of dragging the first application window.

In a possible design, the first device is a laptop computer, and the second device is a tablet computer.

According to a second aspect, this application provides an electronic device, including one or more processors and one or more memories. The one or more memories are coupled to the one or more processors, the one or more memories are configured to store computer program code, and the computer program code includes computer instructions. When the one or more processors execute the computer instructions, a terminal device is enabled to perform a distributed audio playing method.

According to a third aspect, this application provides a computer storage medium. The computer storage medium stores a computer program, and the computer program includes program instructions. When the program instructions are executed by a processor, a distributed audio playing method is performed.

According to the distributed audio playing method provided in this embodiment of this application, when a user uses a plurality of electronic devices, audio corresponding to a window can be automatically managed based on a position of the window, and the user does not need to manually switch. This improves audio use experience in a case of a plurality of devices.

DESCRIPTION OF EMBODIMENTS

Figure 1:
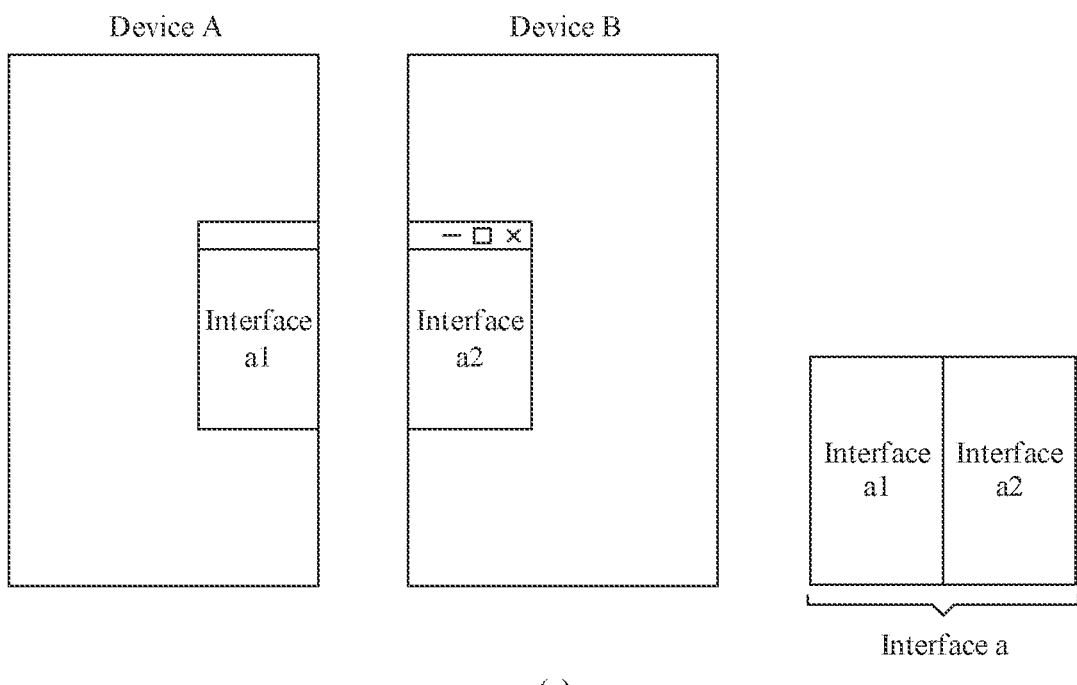
FIG. 1 is an example diagram of two extended display scenarios according to an embodiment of this application.
Figure 1:
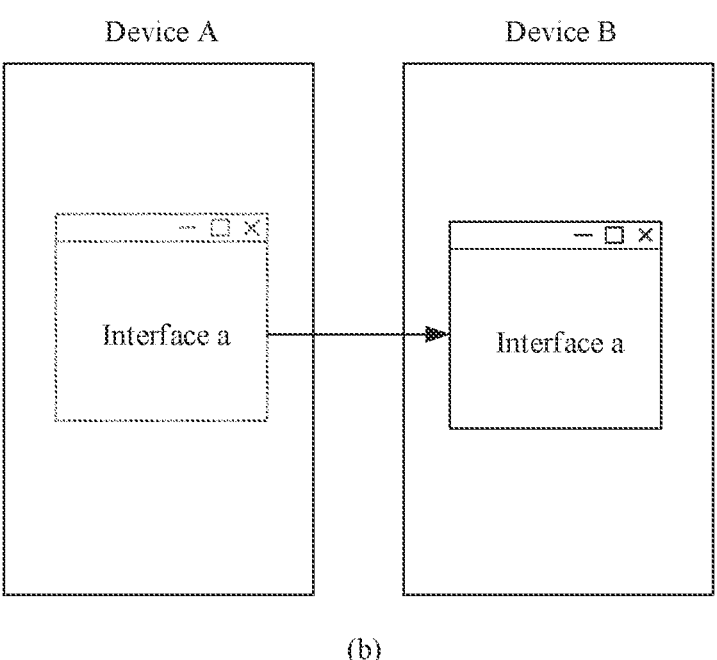

The following describes technical solutions in embodiments of this application with reference to the accompanying drawings in embodiments of this application. In descriptions of embodiments of this application, "/" means "or" unless otherwise specified. For example, A/B may indicate A or B. In this specification, "and/or" describes only an association relationship between associated objects and indicates that three relationships may exist. For example, A and/or B may indicate the following three cases: Only A exists, both A and B exist, and only B exists. In addition, in the descriptions of embodiments of this application, "a plurality of" means two or more than two.

The following terms "First" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments, unless otherwise specified, "a plurality of" means two or more than two.

An embodiment of this application provides a distributed audio playing method. The method is applied to a multi-device distributed display process. For example, the method may be applied to a distributed extended display scenario of a device A (that is, a first device) and a device B (that is, a second device) shown in (a) in FIG. 1 or (b) in FIG. 1.

In this application, a communication connection is established between the first device and the second device. The first device and the second device may implement information transmission between the first device and the second device through the established communication connection. Information transmitted between the first device and the second device includes but is not limited to an application interface configuration parameter, video data, audio data, a control instruction, and the like.

For example, a wireless communication connection may be established between the first device and the second device in a manner like "Tap", "Scan" (for example, scanning a two-dimensional code or a bar code), or "automatic discovery by approaching" (for example, through Bluetooth (Bluetooth, BT) or wireless fidelity (wireless fidelity, Wi-Fi)). The first device and the second device may comply with a wireless transmission protocol, and transmit information by using a wireless connection transceiver. The wireless transmission protocol may include but is not limited to a Bluetooth transmission protocol, a Wi-Fi transmission protocol, or the like. For example, the Wi-Fi transmission protocol may be a Wi-Fi P2P transmission protocol. The wireless connection transceiver includes but is not limited to transceivers such as Bluetooth and Wi-Fi. Information transmission is implemented between the first device and the second device through the established wireless communication connection.

For another example, a wired communication connection may be established between the first device and the second device. For example, a wired communication connection is established between the first device and the second device by using a video graphics adapter (video graphics adapter, VGA), a digital visual interface (digital visual interface, DVI), a high-definition multimedia interface (high-definition multimedia interface, HDMI), a data transmission line, or the like. Information transmission is implemented between the first device and the second device through the established wired communication connection. A specific connection manner between the first device and the second device is not limited in this application.

An electronic device (for example, the first device and the second device) in this application includes one or more displays. For example, the electronic device may be a smartphone, a netbook, a tablet computer, a smart camera, a palmtop, a personal digital assistant (personal digital assistant, PDA), a portable multimedia player (portable multimedia player, PMP), an augmented reality (augmented reality, AR)/virtual reality (virtual reality. VR) device, a notebook computer, a personal computer (personal computer, PC), an ultra-mobile personal computer (ultra-mobile personal computer, UMPC), or the like. Alternatively, the electronic device may be an electronic device that is of another type or structure and that includes a display. This is not limited in this application.

Figure 2:
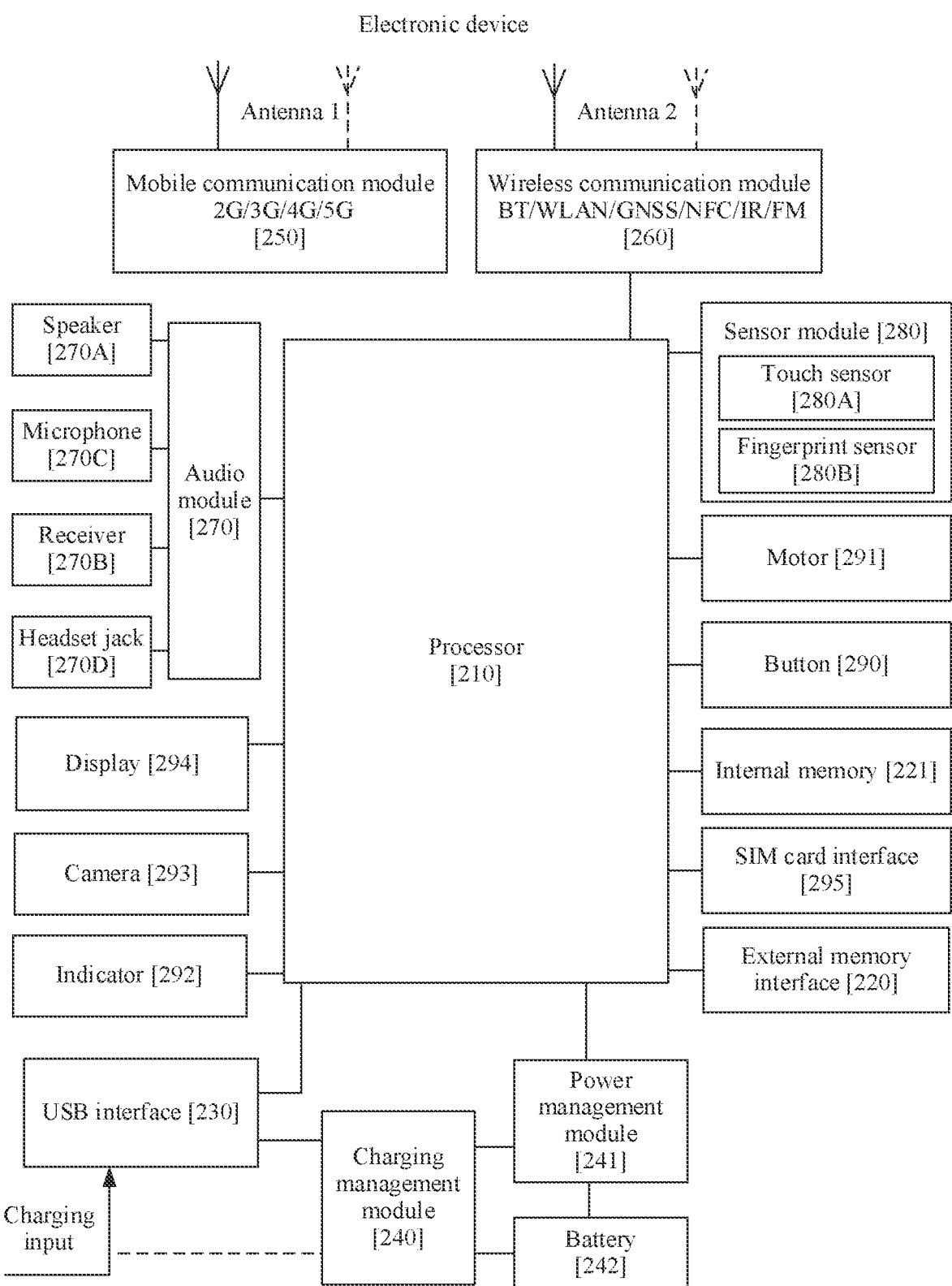
FIG. 2 is a schematic diagram of a hardware structure of an electronic device according to an embodiment of this application.

Refer to FIG. 2. FIG. 2 uses a smartphone as an example and is a schematic diagram of a hardware structure of an electronic device according to an embodiment of this application. As shown in FIG. 2, the electronic device may include a processor 210, a memory (including an external memory interface 220 and an internal memory 221), a universal serial bus (universal serial bus, USB) interface 230, a charging management module 240, a power management module 241, a battery 242, an antenna 1, an antenna 2, a mobile communication module 250, a wireless communication module 260, an audio module 270, a speaker 270A, a receiver 270B, a microphone 270C, a headset jack 270D, a sensor module 280, a button 290, a motor 291, an indicator 292, a camera 293, a display 294, a subscriber identity module (subscriber identity module, SIM) card interface 295, and the like. The sensor module 280 may include a touch sensor 280A and a fingerprint sensor 280B. Further, in some embodiments, the sensor module 280 may further include one or more of a gyroscope sensor, an acceleration sensor, a magnetic sensor, a pressure sensor, a barometric pressure sensor, a distance sensor, an optical proximity sensor, a temperature sensor, an ambient light sensor, a bone conduction sensor, or the like.

It may be understood that the structure shown in this embodiment of the present invention does not constitute a specific limitation on the electronic device. In some other embodiments of this application, the electronic device may include more or fewer components than those shown in the figure, or combine some components, or split some components, or have different component arrangements. The components shown in the figure may be implemented by using hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be separate components, or may be integrated into one or more processors.

The processor 210 may be a nerve center and a command center of the electronic device. The processor 210 may complete instruction fetching according to instructions, generate an operation control signal, and further execute instruction control.

In some embodiments of this application, the processor 210 (for example, the controller in the processor 210) may be configured to: control the audio module 270 to collect audio data corresponding to a dragged interface window, make an audio switching decision, control an output of the audio data corresponding to the dragged interface window to a corresponding device, and the like.

The memory may be further disposed in the processor 210, and is configured to store instructions and data. In some embodiments, the memory in the processor 210 is a cache memory. The memory may store instructions or data that has been used or cyclically used by the processor 210. If the processor 210 needs to use the instructions or the data again, the instructions or the data may be directly invoked from the memory. In this way, repeated access is avoided, and waiting time of the processor 210 is reduced. This improves system efficiency.

In some embodiments, the processor 210 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The charging management module 240 is configured to receive a charging input from a charger. The charger may be a wireless charger or a wired charger. In some embodiments of wired charging, the charging management module 240 may receive a charging input from the wired charger through the USB interface 230. In some embodiments of wireless charging, the charging management module 240 may receive a wireless charging input through a wireless charging coil of the electronic device. The charging management module 240 may supply power to the electronic device by using the power management module 241 while charging the battery 242.

The power management module 241 is configured to connect to the battery 242, the charging management module 240, and the processor 210. The power management module 241 receives an input from the battery 242 and/or the charging management module 240, and supplies power to the processor 210, the internal memory 221, the display 294, the camera 293, the wireless communication module 260, and the like. The power management module 241 may be further configured to monitor parameters such as a battery capacity, a quantity of battery cycles, and a battery health status (an electric leakage or an impedance). In some embodiments, the power management module 241 may also be disposed in the processor 210. In some other embodiments, the power management module 241 and the charging management module 240 may alternatively be disposed in a same device.

A wireless communication function of the electronic device may be implemented by using the antenna 1, the antenna 2, the mobile communication module 250, the wireless communication module 260, the modem processor, the baseband processor, and the like.

The antenna 1 and the antenna 2 are configured to transmit and receive an electromagnetic wave signal. Each antenna in the electronic device may be configured to cover a single or more communication frequency bands. Different antennas may further be multiplexed, to improve antenna usage. For example, the antenna 1 may be multiplexed as a diversity antenna of a wireless local area network. In some other embodiments, the antenna may be used in combination with a tuning switch.

The mobile communication module 250 may provide a solution that includes wireless communication such as 2G/3G/4G/5G and that is applied to the electronic device. The mobile communication module 250 may include at least one filter, a switch, a power amplifier, a low noise amplifier (low noise amplifier, LNA), and the like. The mobile communication module 250 may receive an electromagnetic wave through the antenna 1, perform processing such as filtering or amplification on the received electromagnetic wave, and transmit the electromagnetic wave to the modem processor for demodulation. The mobile communication module 250 may further amplify a signal modulated by the modem processor, and convert the signal into an electromagnetic wave through the antenna 1 for radiation. In some embodiments, at least some functional modules of the mobile communication module 250 may be disposed in the processor 210. In some embodiments, at least some functional modules of the mobile communication module 250 may be disposed in a same component as at least some modules of the processor 210.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a sound signal by using an audio device (not limited to the speaker 270A, the receiver 270B, or the like), or displays an image or a video by using the display 294. In some embodiments, the modem processor may be an independent device. In some other embodiments, the modem processor may be independent of the processor 210, and is disposed in a same component as the mobile communication module 250 or another functional module.

The wireless communication module 260 may provide a solution that is applied to the electronic device and that includes wireless communication like a wireless local area network (wireless local area network, WLAN) (for example, a Wi-Fi network), Bluetooth BT, a global navigation satellite system (global navigation satellite system, GNSS), frequency modulation (frequency modulation, FM), a near field communication (near field communication, NFC) technology, and an infrared (infrared, IR) technology. The wireless communication module 260 may be one or more devices that integrate at least one communication processing module. The wireless communication module 260 receives an electromagnetic wave through the antenna 2, performs frequency modulation and filtering processing on an electromagnetic wave signal, and sends a processed signal to the processor 210. The wireless communication module 260 may further receive a to-be-sent signal from the processor 210, perform frequency modulation and amplification on the signal, and convert the signal into an electromagnetic wave through the antenna 2 for radiation.

In some embodiments, the antenna 1 of the electronic device is coupled to the mobile communication module 250, and the antenna 2 is coupled to the wireless communication module 260, so that the electronic device can communicate with a network and another device through a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a Bei-Dou navigation satellite system (BeiDou navigation satellite system, BDS), a quasi-zenith satellite system (quasi-zenith satellite system, QZSS), and/or a satellite based augmentation system (satellite based augmentation system, SBAS). In some embodiments of this application, the first device and the second device may implement information transmission between the first device and the second device based on a wireless communication technology through respective antennas and mobile communication modules.

The electronic device implements a display function by using the GPU, the display 294, the application processor, and the like. The GPU is a microprocessor for image processing, and is connected to the display 294 and the application processor. The GPU is configured to perform mathematical and geometric calculations for graphics rendering. The processor 210 may include one or more GPUs that execute program instructions to generate or change display information. In this embodiment of this application, the display 294 is configured to display an image, a video, and the like. The display 294 includes a display panel. The display panel may be a liquid crystal display (liquid crystal display, LCD), an organic light-emitting diode (organic light-emitting diode, OLED), an active-matrix organic light emitting diode or active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device may include one or N displays 294, where N is a positive integer greater than 1.

In this embodiment of this application, the GPU may be configured to render an application interface. Correspondingly, the display 294 may be configured to display the application interface rendered by the GPU. For example, in the scenario shown in (a) in FIG. 1, the GPU of the first device may be configured to render an interface a before extended display to the second device. Correspondingly, a display of the first device may be configured to display the interface a rendered by the GPU. After extended display from the first device to the second device, the GPU of the first device may be configured to: render the interface a before the extended display to the second device, split the interface a into an interface a1 and an interface a2, display the interface a1 on the display of the first device, and display the interface a2 on a display of the second device.

The electronic device may implement a photographing function by using the ISP, the camera 293, the video codec, the GPU, the display 294, the application processor, and the like.

The external memory interface 220 may be configured to connect to an external storage card, for example, a micro SD card, to extend a storage capability of the electronic device. The external memory card communicates with the processor 210 through the external memory interface 220, to implement a data storage function. For example, files such as music and a video are stored in the external memory card.

The internal memory 221 may be configured to store computer-executable program code, where the executable program code includes instructions. The internal memory 221 may include a program storage area and a data storage area. The program storage area may store an operating system, an application required by at least one function (for example, a sound playing function and an image playing function), and the like. The data storage area may store data (like audio data and a phone book) created during use of the electronic device. In addition, the internal memory 221 may include a high speed random access memory, and may further include a nonvolatile memory, for example, at least one magnetic disk storage device, a flash storage device, or a universal flash memory (universal flash storage, UFS). The processor 210 executes various function applications of a portable device and data processing by running the instructions stored in the internal memory 221 and/or the instructions stored in the memory disposed in the processor.

The touch sensor 280A may be referred to as a "touch panel". The touch sensor 280A may be disposed on the display 294. The touch sensor 280A and the display 294 constitute a touchscreen, which is also referred to as a "touch screen". The touch sensor 280A is configured to detect a touch operation performed on or near the touch sensor 280A. The touch sensor 280A may transfer a detected touch operation to the application processor, to determine a touch event type. The electronic device may provide, by using the display 294, a visual output related to the touch operation. In some other embodiments, the touch sensor 280A may be also disposed on a surface of the electronic device at a position different from a position of the display 294. In this embodiment of this application, the touch sensor of the first device may be configured to detect a dragging operation on an interface window performed by a user on the display of the first device.

The fingerprint sensor 280B is configured to collect a fingerprint. The electronic device may use a feature of a collected fingerprint to implement fingerprint-based unlocking, application lock access, fingerprint-based photographing, fingerprint-based call answering, and the like.

The electronic device may implement an audio function by using the audio module 270, the speaker 270A, the receiver 270B, the microphone 270C, the application processor, and the like. For example, playing music, and recording. For specific working principles and functions of the audio module 270, the speaker 270A, the receiver 270B, and the microphone 270C, refer to descriptions in a conventional technology.

In some embodiments of this application, the audio module 270 may be configured to collect audio data corresponding to a dragged window. The speaker 270A may be configured to output the audio data corresponding to the dragged window. The microphone 270C may be configured to collect a sound in an environment, for example, collect a sound of a user in a process of making a video call.

The button 290 includes a power button, a volume button, and the like. The button 290 may be a mechanical button, or may be a touch key. The electronic device may receive a button input, and generate a signal input of a button related to a user setting and function control of the electronic device.

It should be noted that, hardware modules included in the electronic device shown in FIG. 2 are merely described as an example, and do not limit a specific structure of the electronic device. For example, the electronic device may further include another functional module.

In this application, an operating system of the electronic device may include but is not limited to operating systems such as Symbian® (Symbian®), Android® (Android®), Windows®, Apple® (iOS®), Blackberry® (Blackberry)®), and Harmony (Harmony). This is not limited in this application.

Figure 3:
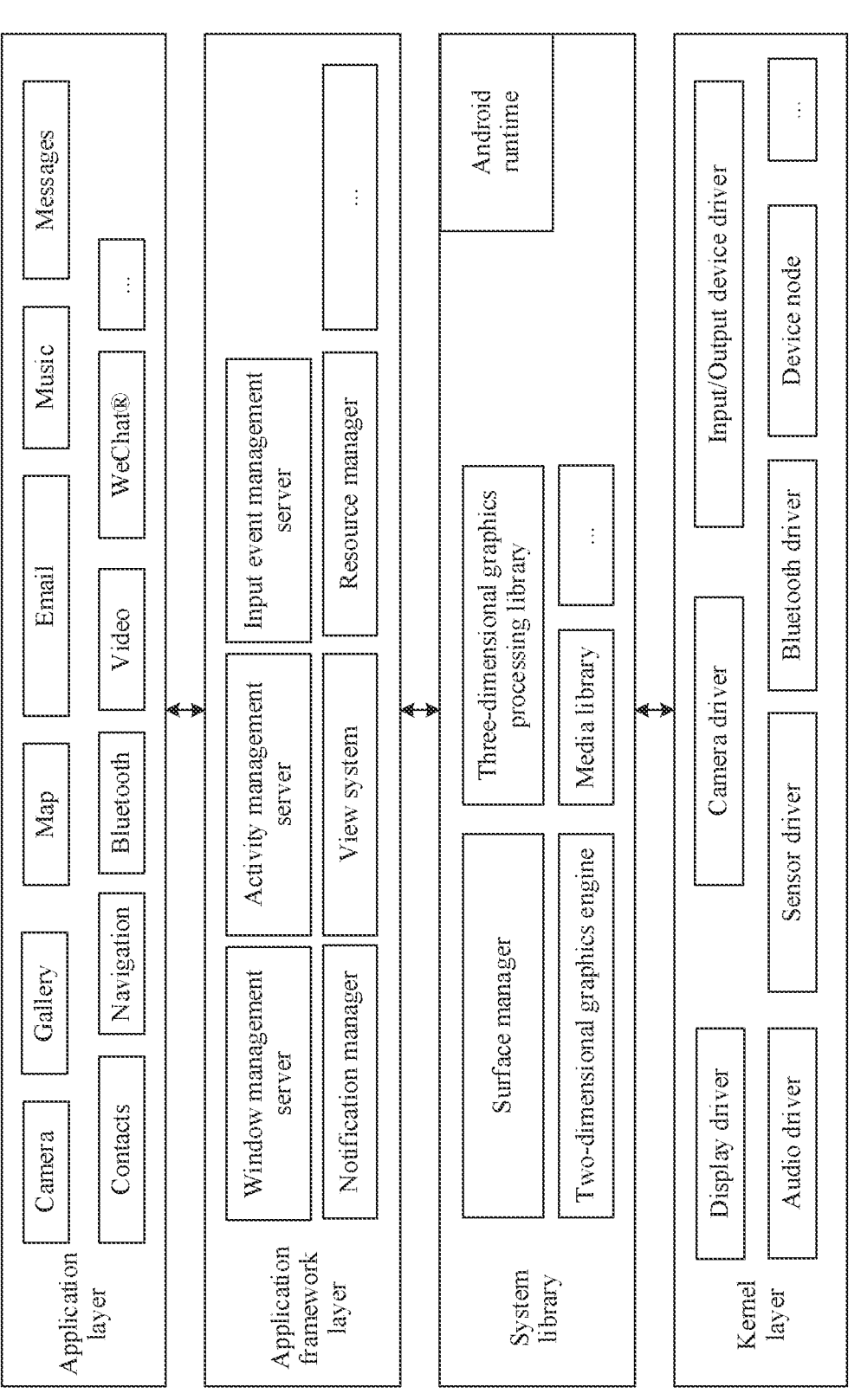
FIG. 3 is a schematic diagram of a software structure of an electronic device according to an embodiment of this application.

Refer to FIG. 3. FIG. 3 uses an Android operating system as an example and is specifically a schematic diagram of a software structure of an electronic device according to an embodiment of this application.

As shown in FIG. 3, the Android operating system may include an application layer, an application framework (framework, FWK) layer, a system library, Android runtime and a kernel (kernel) layer.

The application layer may provide some core applications. For ease of description, the application is referred to as an application for short below. An application at the application layer may include an original application (for example, an application that is installed in the electronic device when an operating system is installed before the electronic device is delivered from a factory), for example, Camera, Map. Music, Messages, Gallery, Email, Contacts, or Bluetooth shown in FIG. 3. The application at the application layer may also include a third-party application (for example, an application downloaded and installed by a user in an application store), for example, applications such as WeChat® and Video shown in FIG. 3.

The application framework layer provides an application programming interface (application programming interface, API) and a programming framework for the application at the application layer. The application framework layer includes some predefined functions. As shown in FIG. 3, the application framework layer may include a window management server (window management server, WMS), an activity management server (activity management server, AMS), an input event management server (input event management server, IMS), a resource manager, a notification manager, a view system, and the like.

The WMS is mainly used to manage a window program. The window management server can obtain a size of a display, and determine whether there is a status bar, screen locking, screen capturing, and the like.

The AMS is mainly used to manage an activity, start, switch, and schedule components in a system, and manage and schedule an application.

The IMS is mainly used to perform processing such as translation and encapsulation on an original input event to obtain an input event that includes more information, and send the input event to the WMS. The WMS stores a clickable area (for example, a control) of each application, position information of a focus window, and the like. Therefore, the WMS can correctly distribute the input event to a specified control or focus window. For example, in this embodiment of this application, the WMS may be configured to distribute a received window dragging event to a specified control or focus window.

The view system includes visual controls such as a control for displaying a text and a control for displaying a picture. The view system is mainly used to build an application. A display interface may include one or more views, for example, include a display interface of a message notification icon, and may include a view for displaying a text and a view for displaying a picture. For example, in this embodiment of this application, the view system may be used to build a text control, a picture control, and the like on an application interface displayed on the electronic device.

The notification manager enables an application to display notification information in a status bar, and may be used to convey a notification type message. The message may automatically disappear after a short pause without user interaction. For example, the notification manager is used to notify download completion, a message notification, and the like. The notification manager may alternatively be a notification that appears in a top of a status bar in a system in a form of a graph or a scroll bar text, for example, a notification of an application running on a background or a notification that appears on a screen in a form of a dialog window. For example, text information is prompted in the status bar, a prompt tone is produced, the electronic device vibrates, or an indicator light blinks. For example, in this embodiment of this application, the notification manager may be used to: when the first device detects a user operation of dragging an interface window to the second device, notify the user that extended display is being performed. Further, the notification manager may be further used to: when the dragged interface window is completely extended from the first device to the second device, notify the user that the extended display is completed.

The resource manager is mainly used to provide various resources for an application, such as a localized character string, an icon, a picture, a layout file, and a video file. For example, in this embodiment of this application, the resource manager may be used to provide a localized character string, an icon, a picture, a layout file, a video file, or the like for an application interface displayed on the electronic device.

The system library and Android runtime include a performance function that needs to be called by the FWK, an Android core library, and an Android virtual machine. The system library may include a plurality of functional modules. For example, a surface manager, a three-dimensional graphics processing library, a two-dimensional graphics engine, and a media library.

The kernel layer is a basis of the Android operating system, and all final functions of the Android operating system are completed at the kernel layer. The kernel layer may include a display driver, an input/output device driver (for example, a keyboard, a touchscreen, a headset, a speaker, or a microphone), a device node, a Bluetooth driver, a camera driver, an audio driver, a sensor driver, and the like. A user performs an input operation by using an input device. The kernel layer may generate a corresponding original input event based on the input operation, and store the original input event in the device node.

In this embodiment of this application, the sensor driver may detect a sliding operation performed by the user on a display of the electronic device. When the sliding operation is a dragging operation on an interface window, the sensor driver reports a window dragging event to the IMS at the application framework layer. After receiving the dragging event reported by the IMS, the WMS distributes the window dragging event to a corresponding application, so that an application interface window is triggered to move on an electronic device interface as the user drags.

It should be noted that FIG. 3 describes a software structure of an electronic device by using only an Android system with a layered architecture as an example. A specific architecture of a software system of the electronic device (including the first device and the second device) is not limited in this application. For a specific description of a software system of another architecture, refer to a conventional technology.

As described above, the distributed audio playing method provided in this embodiment of this application is applied to a multi-device distributed display process. In an implementation, in this embodiment of this application, multi-device distributed display may be implemented through dragging of an application window by a user. For example, based on a user operation of dragging an interface (for example, the interface a shown in (b) in FIG. 1) window displayed on the first device (for example, the device A shown in (b) in FIG. 1) to an extended device (that is, the second device, for example, the device B shown in (b) in FIG. 1), the dragged interface on the first device is displayed on the second device in an extended manner. In a process in which the user drags the interface (that is, the interface A) window displayed on the first device (that is, the device A) to the second device (that is, the device B), a first part (the interface a1 shown in (a) in FIG. 1) of the interface A is displayed on a display of the first device (that is, the device A), and a second part (the interface a2 shown in (a) in FIG. 1) of the interface a is displayed on a display of the second device (that is, the device B).

In a scenario similar to the foregoing scenario in which the user drags the interface window displayed on the first device to the second device, the distributed audio playing method provided in this embodiment of this application can implement that audio is adaptively switched based on a distributed display status of an interface. Specifically, when the user has not dragged the interface window or has not dragged the interface window out of a range of the display of the first device, only the first device plays audio corresponding to an interface. When the user drags the interface window to a cross-device distributed display state shown in (a) in FIG. 1, the audio corresponding to the interface is switched to the second device, and the second device and the first device synchronously play the audio corresponding to the interface in a distributed manner. When the user drags the interface window to a display transfer state shown in (b) in FIG. 1, the audio corresponding to the interface is switched from the first device to the second device, and the first device no longer plays the audio corresponding to interface.

Further, in some embodiments, in a process in which the interface is dragged by the user from the first device to the second device, the first device may adaptively adjust, based on proportions the interface of the first part (the interface a1 shown in (a) in FIG. 1) and the second part (the interface a2 shown in (a) in FIG. 1) respectively on the display of the first device and the display of the second device, volume at which the first device and the second device synchronously play the audio corresponding to the interface in a distributed manner.

Figure 4:
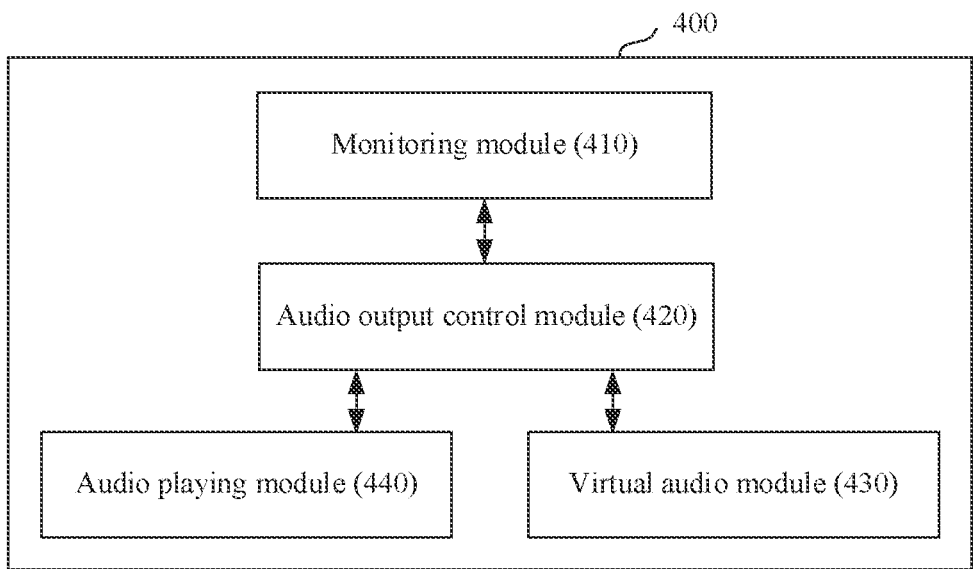
FIG. 4 is an example diagram of a distributed audio playing framework according to an embodiment of this application.

The distributed audio playing method provided in this embodiment of this application may be implemented based on a framework shown in FIG. 4. As shown in FIG. 4, a distributed audio playing framework 400 provided in this embodiment of this application may include a monitoring module 410, an audio output control module 420, a virtual audio module 430, and an audio playing module 440.

The monitoring module 410 is mainly used to monitor positions of all interface windows displayed on the first device, to detect in time, a window dragging event that an application window is dragged by a user to the second device. When the window dragging event that the application window is dragged by the user to the second device is detected, the window dragging event is sent to the audio output control module 420, so that the audio output control module 420 intercepts (for example, hooks) the window dragging event, and triggers, based on the window dragging event, the virtual audio module 430 to collect audio data corresponding to the dragged interface window. In some embodiments, the monitoring module 410 may detect only a position of a focus window, that is, a position of a window operated by a user last time, or a position of a foreground window.

Interception means that transmission of an event is intercepted and monitored before the event is transmitted to an end point. For example, before an event is transmitted to an end point, the event may be hooked through a hook technology like a hook, the event may be processed in time, and the event may be responded to in time. In this embodiment of this application, the audio output control module 420 may respond to the window dragging event at the first time when intercepting the window dragging event.

Further, the monitoring module 410 is further used to monitor audio states corresponding to all interfaces that are with audio information and that are displayed on the first device, for example, playing, pause, mute, or exit, so that a specific policy of playing audio on the first device and the second device in a distributed manner may be determined based on a specific audio state. For example, in the scenario shown in (b) in FIG. 1, when the audio state is playing, the first device switches the audio corresponding to the interface from the first device to the second device for playing; or when the audio state is mute, pause, or exit, the first device gives up switching the audio corresponding to the interface from the first device to the second device.

In a possible structure, a part of the monitoring module 410 may be located in a sensor module (the sensor module 280 shown in FIG. 2) of an electronic device, and a part of the monitoring module 410 is located in an audio module (the audio module 270 shown in FIG. 2) of the electronic device. Some functions of the monitoring module 410 may be implemented by the sensor module (the sensor module 280 shown in FIG. 2) of the electronic device, and some functions the monitoring module may be implemented by the audio module (the audio module 270 shown in FIG. 2) of the electronic device. For example, the sensor module of the electronic device is configured to: monitor positions of all interface windows displayed on the first device, and send a window dragging event to the audio output control module 420 when detecting the window dragging event that an application window is dragged by a user to the second device. The audio module of the electronic device is configured to monitor audio states corresponding to all interfaces that are with audio information and that are displayed on the first device, for example, playing, pause, mute, or exit.

In another possible structure, the monitoring module 410 may be located in a processor (the processor 210 shown in FIG. 2) of the electronic device. For example, the monitoring module 410 of the first device may receive a window dragging event that is detected by the sensor module (the sensor module 280 shown in FIG. 2) of the first device and that an application window is dragged by a user to the second device, and send the window dragging event to the audio output control module 420. The monitoring module 410 of the first device may further receive audio states that are detected by the audio module (the audio module 270 shown in FIG. 2) of the first device and that correspond to all interfaces that are with audio information and that are displayed on the first device. A specific manner of setting the monitoring module 410 in the electronic device (for example, the first device) is not limited in this application.

The audio output control module 420 is mainly configured to: when the monitoring module 410 detects that a user drags an application interface window on the first device to the second device, intercept (for example, hook) the window dragging event from the monitoring module 410, and trigger, based on the window dragging event, the virtual audio module 430 to collect audio data corresponding to the dragged interface window.

The window dragging event further carries information like a position to which a window is dragged. Further, the audio output control module 420 is further configured to make an audio switching decision based on the position to which a window is dragged, for example, whether to switch audio from the first device to the second device, and how to switch audio (for example, distributed synchronous playing or complete switching). In addition, after determining how to switch audio, the audio output control module 420 is further configured to control switching of the audio data corresponding to the dragged interface window between the first device and the second device, for example, control an output, to a corresponding device, of the audio data corresponding to the dragged interface window.

Further, the audio output control module 420 is further configured to control audio volume at which audio corresponding to the dragged interface window is played on the first device and/or the second device. For example, a control instruction is sent to the first device and/or the second device, to control volume at which audio corresponding to the dragged interface window is played on the first device and/or the second device.

In a possible structure, the audio output control module 420 may be located in a processor (the processor 210 shown in FIG. 2) of the electronic device. For example, the audio output control module 420 may be located in the controller in the processor 210. For another example, the audio output control module 420 may be independent of the controller in the processor 210 shown in FIG. 2, and is located in the processor 210. A specific manner of setting the audio output control module 420 in the electronic device (for example, the first device) is not limited in this application.

The virtual audio module 430 is mainly configured to: in a process in which the monitoring module 410 detects that an interface window on the first device is dragged by a user to the second device, collect audio data corresponding to an interface, so that the audio output control module 420 controls, after making an audio switching decision based on a position to which the window is dragged, an output, to a corresponding device, of the audio data that is collected by the virtual audio module 430 and that corresponds to the dragged interface window.

In a possible structure, the virtual audio module may be located in an audio module (the audio module 270 shown in FIG. 2) of the electronic device. Specifically, the audio module 270 shown in FIG. 2 may include a first audio module and a second audio module. The first audio module is a regular audio module, and the second audio module is the virtual audio module 430.

In another possible structure, the virtual audio module may alternatively be independent of the audio module 270 shown in FIG. 2. For this case, the virtual audio module 430 needs to be added in the diagram of the hardware structure shown in FIG. 2. In this case, the audio module 270 shown in FIG. 2 is a regular audio module. A specific manner of setting the virtual audio module in the electronic device (for example, the first device) is not limited in this application.

The regular audio module is mainly configured to: input audio data corresponding to a dragged interface window to the audio playing module 440 of the first device for playing, and adjust, according to an instruction of the audio output control module 420, volume at which the audio playing module 440 plays the audio data corresponding to the dragged interface window. Further, the regular audio module may be further configured to input audio data corresponding to an interface window that is not dragged and displayed on the first device to the audio playing module 440 of the first device for playing.

The audio playing module 440 is mainly configured to receive audio data from the regular audio module and play audio. The audio data from the regular audio module may be the audio data corresponding to the dragged interface window, or may be the audio data corresponding to the interface window that is not dragged and displayed on the first device. In a case in which the audio data from the regular audio module is the audio data corresponding to the dragged interface window, the audio playing module 440 is further configured to control audio playing volume according to a volume control instruction of the regular audio module. In a possible structure, the audio playing module 440 may be the speaker 270A shown in FIG. 2.

It should be noted that FIG. 4 is merely an example of a distributed audio playing framework. The monitoring module 410, the audio output control module 420, the virtual audio module 430, and the audio playing module 440 are merely used as a possible module division manner. The distributed audio playing framework in this embodiment of this application may have more or fewer modules than those shown in FIG. 4, may combine two or more modules, or may have different module division. In addition, various modules shown in FIG. 4 may be implemented in hardware including one or more signal processing circuits or application-specific integrated circuits, in software, or in a combination of hardware and software.

Figure 5A:
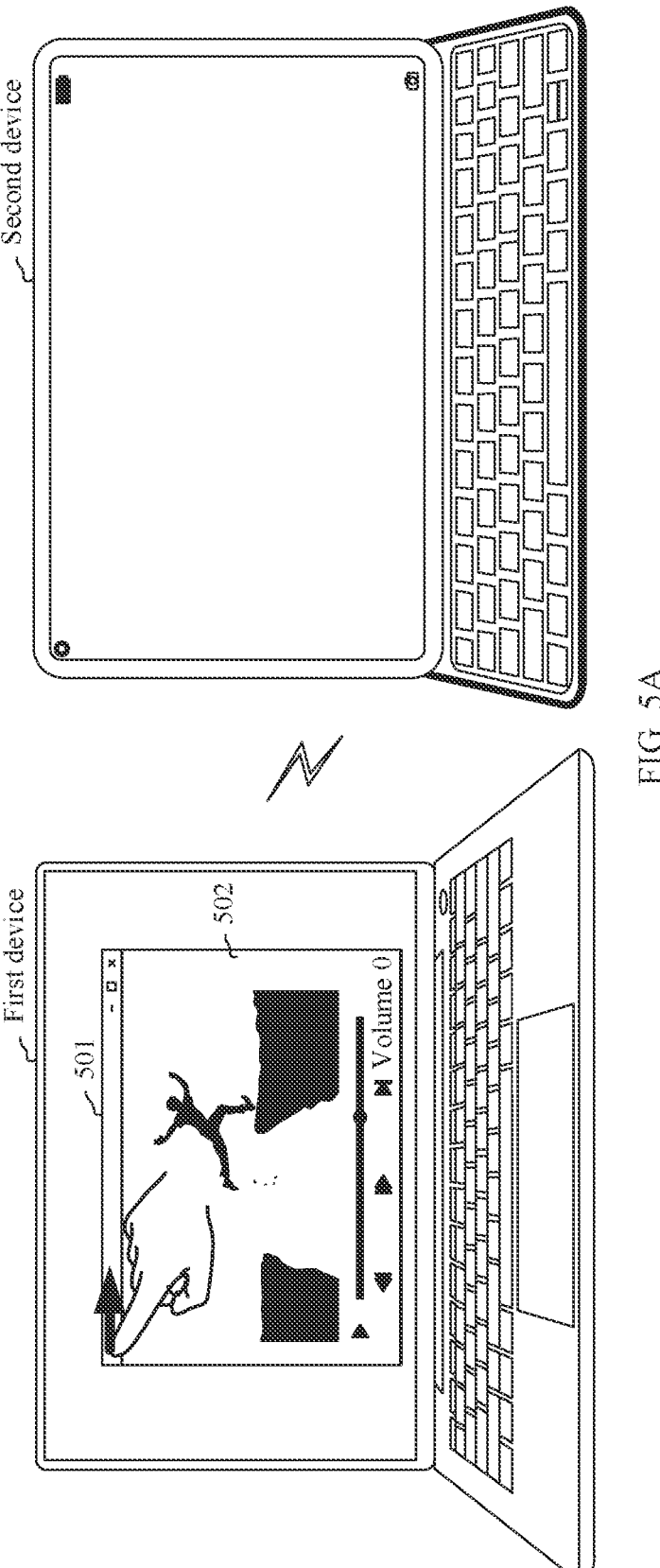
FIG. 5A is an example diagram of a scenario in which a first device plays a video according to an embodiment of this application.
Figure 5B:
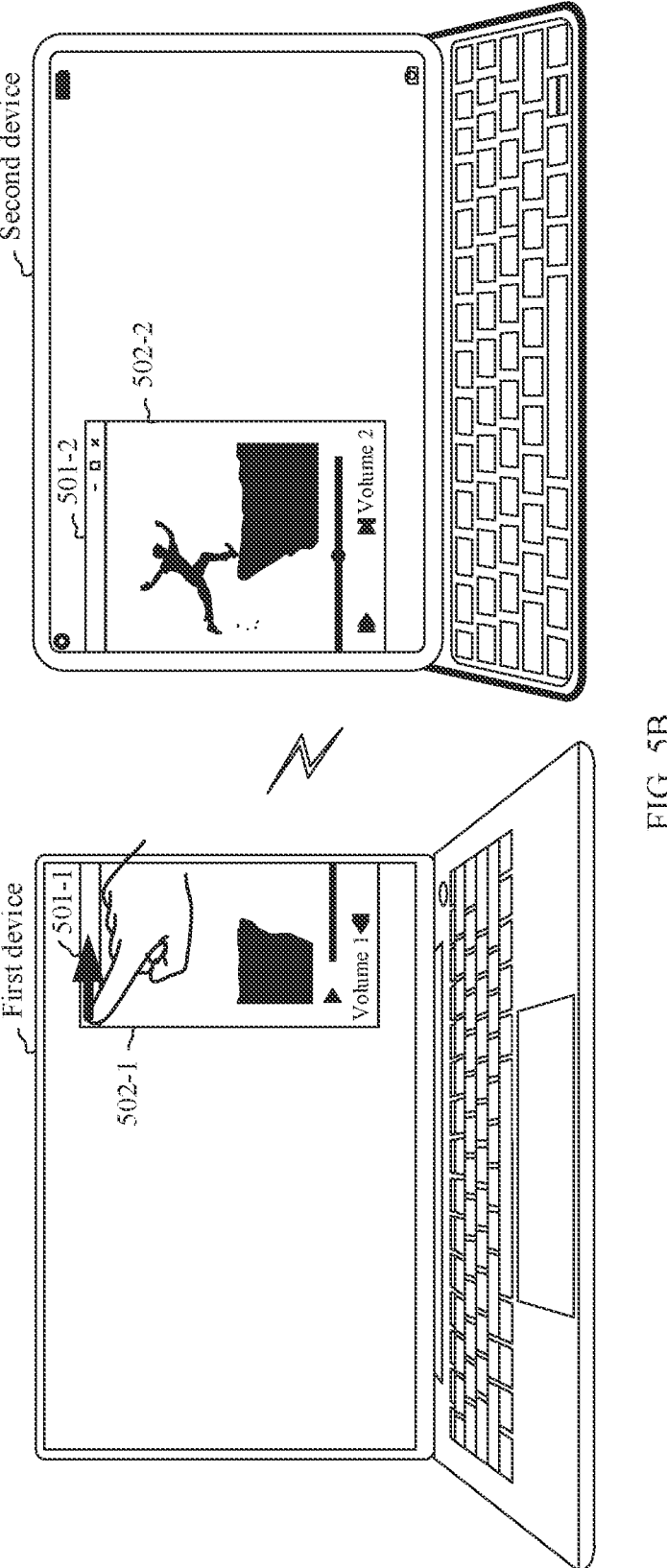
FIG. 5B is an example diagram of a scenario in which a video playing interface is displayed from a first device to a second device in an extended manner according to an embodiment of this application.
Figure 5C:
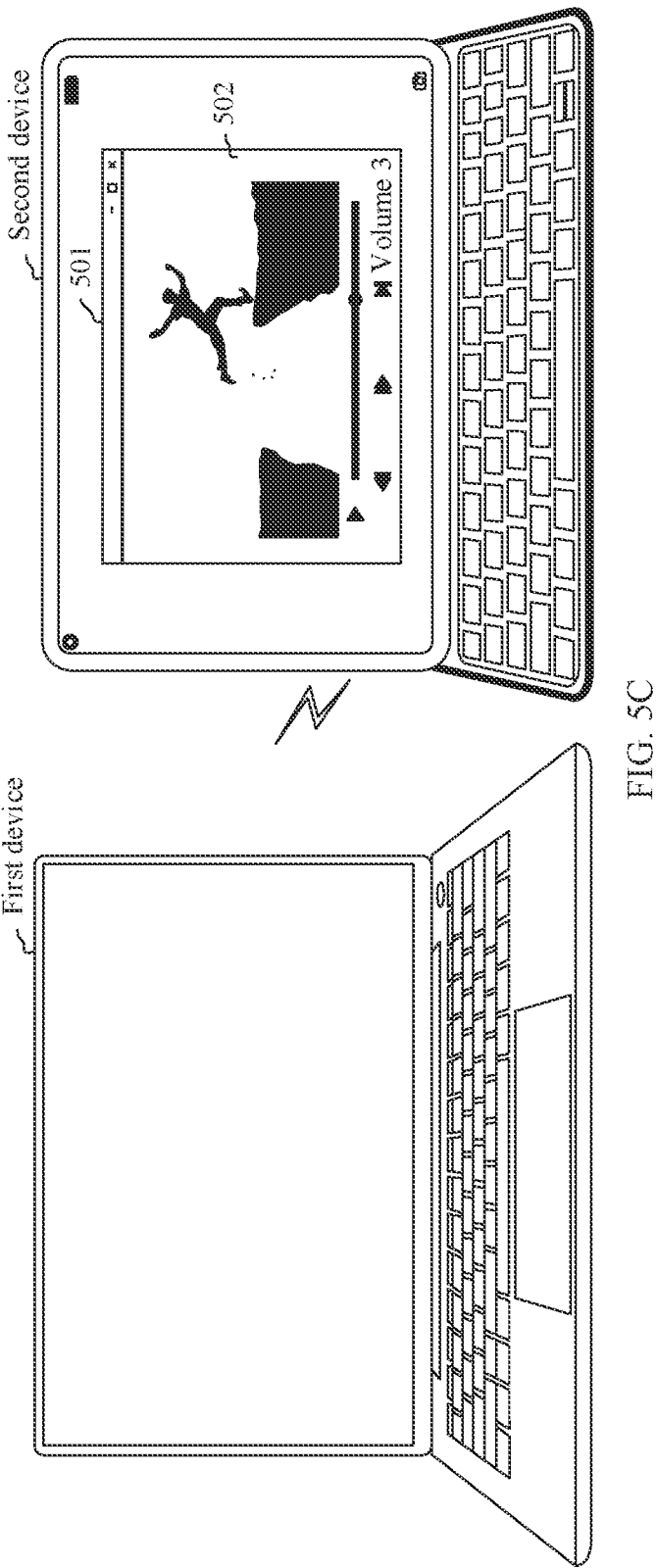
FIG. 5C is an example diagram of another scenario in which a video playing interface is displayed from a first device to a second device in an extended manner according to an embodiment of this application.

With reference to the accompanying drawings, the following specifically describes a distributed audio playing method provided in an embodiment of this application by using an example in which the first device is a notebook computer, the second device is a tablet computer, and a dragged interface window is a video application window, and an extended scenario in which a status changes from FIG. 5A to FIG. 5B, and then to FIG. 5C.

It is assumed that the first device is a notebook computer, the second device is a tablet computer, and a video application window 501 shown in FIG. 5A is displayed on the first device. The video application window 501 includes a video playing interface 502. The first device responds to a user operation of dragging the video application window 501 from a video play state shown in FIG. 5A to an extended display state shown in FIG. 5B, and the first device and the second device display the video playing interface 502 through cross-device distribution in a splicing manner. In the state shown in FIG. 5B, the first device controls the audio corresponding to the video playing interface 502 to be synchronously played on the first device and the second device in a distributed manner.

Further, the first device transfers the video playing interface 502 to the second device in response to a user operation of dragging the video application window 501 from the extended display state shown in FIG. 5B to an extended display state shown in FIG. 5C. In the extended display state shown in FIG. 5C, the first device controls the audio corresponding to the video playing interface 502 to be completely switched from the first device to the second device.

In some embodiments, in response to the user operation of dragging the video application window 501 from the video play state shown in FIG. 5A to the extended display state shown in FIG. 5B, when the first device and the second device synchronously play the audio corresponding to the video playing interface 502 in a distributed manner, the first device may further control volume at which the audio corresponding to the video playing interface 502 is respectively played by the first device and the second device.

The following describes in detail the distributed audio playing method in the extended scenario in which a state changes from FIG. 5A to FIG. 5B, and then to FIG. 5C.

Figure 6A:
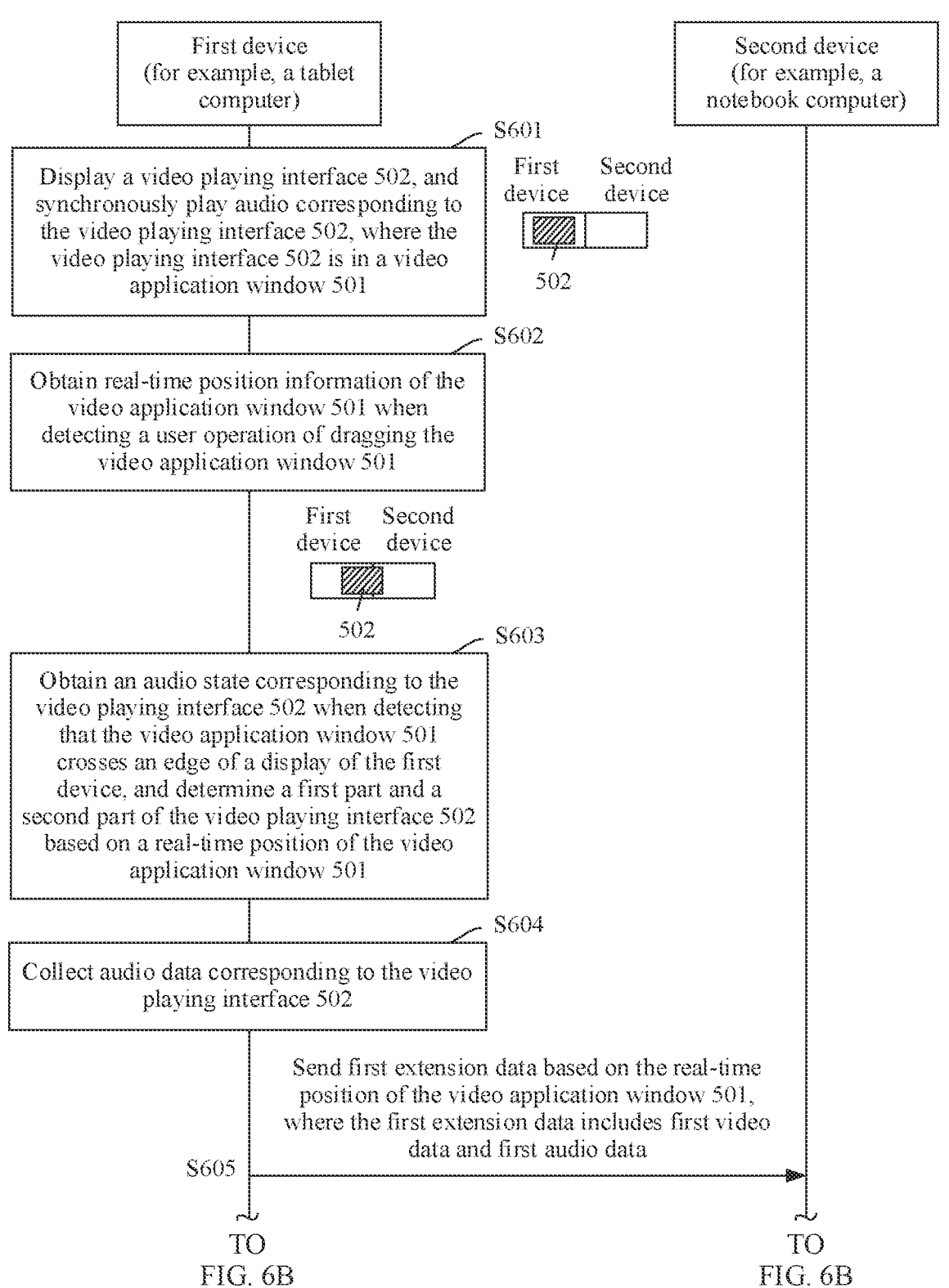
FIG. 6A and FIG. 6B are a flowchart of a distributed audio playing method according to an embodiment of this application.
Figure 6B:
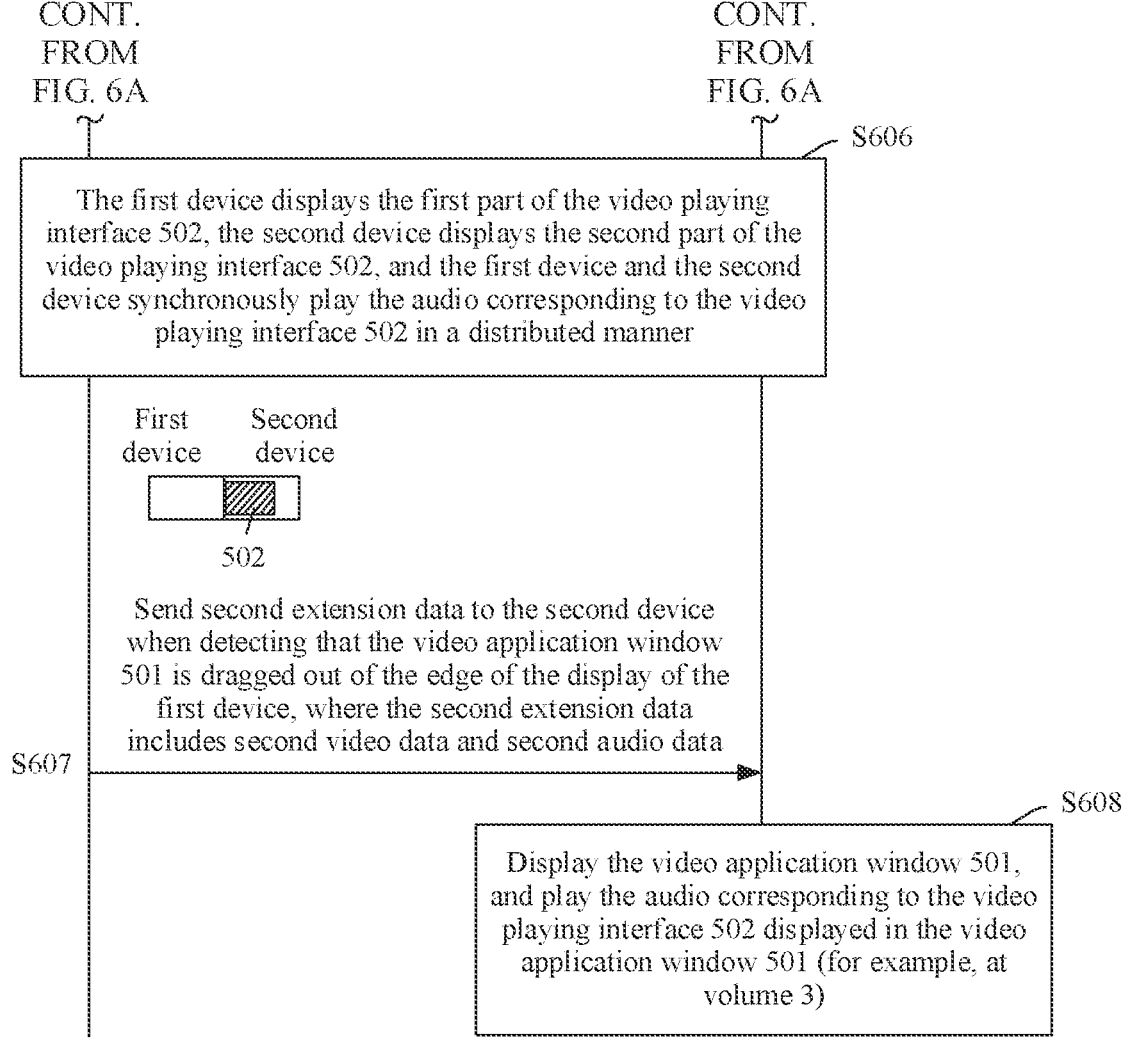

As shown in FIG. 6A and FIG. 6B, a distributed audio playing method provided in an embodiment of this application may include the following steps S601 to S606.

S601: A first device displays a video playing interface 502, and synchronously plays audio corresponding to the video playing interface 502. The video playing interface 502 is in a video application window 501.

That the first device displays the video playing interface 502 and synchronously plays the audio corresponding to the video playing interface 502 specifically means that the first device plays audio corresponding to a video while playing the video in the video playing interface 502.

For example, the first device may play, by using a conventional method, the video in the video playing interface 502 and the audio corresponding to the video. For example, the first device may obtain, by using a video driver of the first device, video data corresponding to the video playing interface 502 from a video application, and send the video data to a display to play a video by using the display; and synchronously, the first device may obtain, by using a regular audio driver (for example, an audio driver corresponding to the regular audio module described above) of the first device, audio data corresponding to the video playing interface 502 from the video application, and play audio through a speaker. For a specific implementation process in which the first device plays a synchronously played video and corresponding audio, refer to descriptions in a conventional technology. Details are not described herein again.

S602: The first device obtains real-time position information of the video application window 501 when detecting a user operation of dragging the video application window 501.

For example, in this embodiment of this application, the first device may detect, by using a sensor driver, a sliding operation performed by a user on a display of the first device. When the sliding operation is a dragging operation on an interface window (for example, the video application window 501 shown in FIG. 5A), the first device obtains real-time position information of the video application window 501.

The real-time position information of the video application window 501 is real-time coordinate information of the video application window 501 in a preset coordinate system.

For example, the preset coordinate system may be a preset coordinate system of the first device, a world coordinate system, a ground coordinate system, or the like. This is not limited in this application. For example, the preset coordinate system of the first device may be a two-dimensional coordinate system corresponding to the display of the first device. For example, the first device is the notebook computer shown in FIG. 5A. The two-dimensional coordinate system may be a coordinate system formed by using a lower left corner of the notebook computer as a coordinate origin O, a lower short side as an x-axis, and a left long side as a y-axis when the notebook computer is in a state shown in FIG. 5A.

It should be noted that, in this embodiment of this application, in a process in which the video application window 501 is dragged by the user, the first device continuously obtains the real-time position information of the video application window 501. By continuously obtaining the real-time position information of the video application window 501, the first device may accurately obtain an occasion at which the video playing interface 502 is displayed from the first device to the second device in an extended manner, to make a response in time.

In this embodiment of this application, when the first device detects the user operation of dragging the video application window 501, the first device may monitor a position of the video application window 501 in real time by using the monitoring module 410, so that position information of the video application window 501 may be obtained in real time by using the sensor driver.

Figure 7:
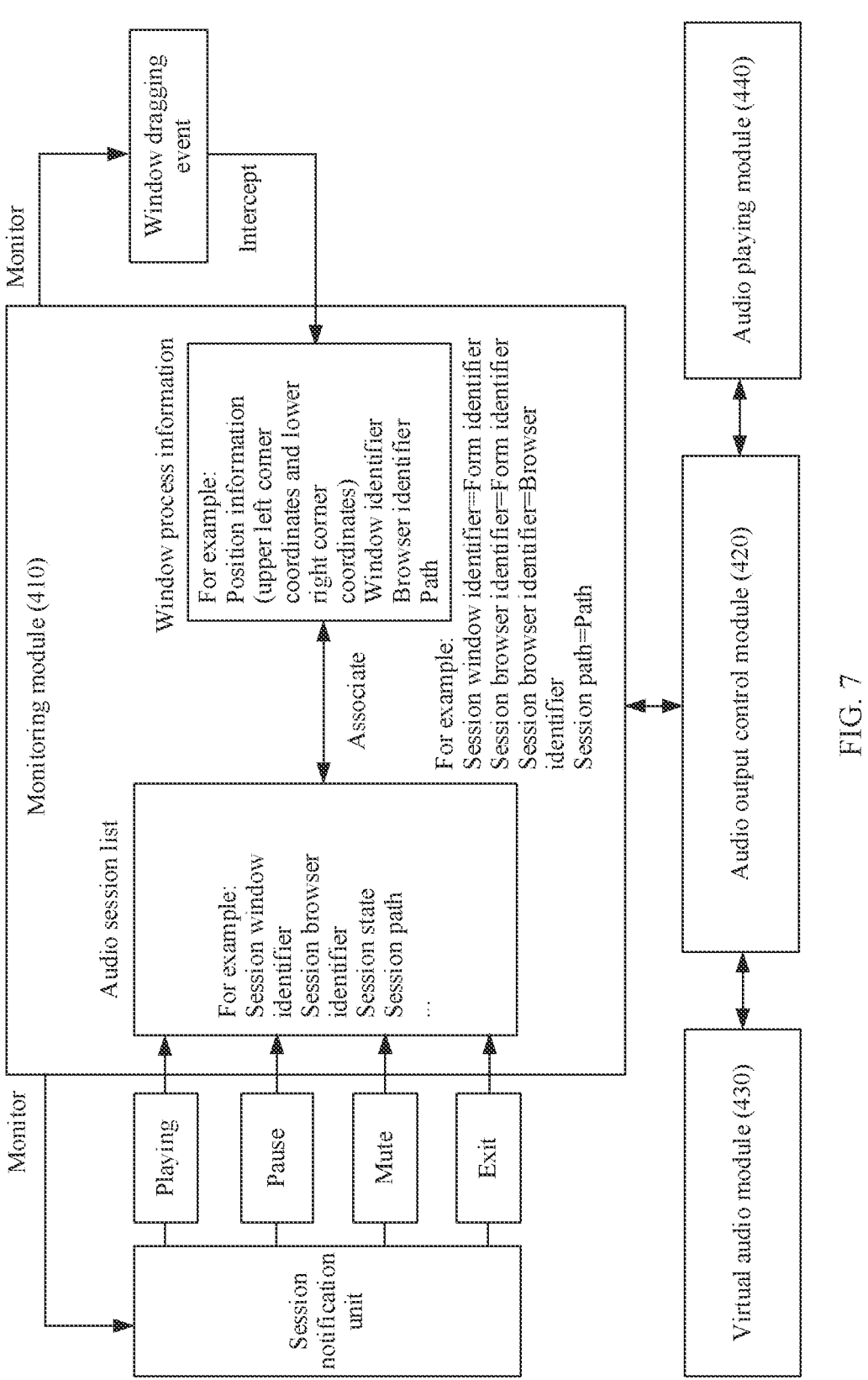
FIG. 7 is a logical block diagram 1 of an internal implementation of a first device in a distributed audio playing process according to an embodiment of this application.

For example, the monitoring module 410 of the first device monitors the sensor drive in real time, to intercept (for example, hook) a window dragging event in time. As shown in FIG. 7, after monitoring a window dragging event, the monitoring module 410 intercepts the window dragging event. In addition, for example, in a process of dragging a window, the monitoring module 410 obtains window process information of the dragged window (for example, the video application window 501) in real time. The window process information includes position (position) information of the window.

For example, the monitoring module 410 may obtain, by using the sensor driver, the following position information of the dragged window (for example, the video application window 501) in real time: coordinates (for example, left_up_x, left_up_y) of an upper left corner of the dragged window in a preset coordinate system, and coordinates (for example, right_down_x, right_down_y) of a lower right corner of the dragged window in the preset coordinate system. For another example, the monitoring module 410 may obtain, by using the sensor driver, the following position information of the dragged window (for example, the video application window 501) in real time: coordinates (for example, left_down_x, left_down_y) of a lower left corner of the dragged window in a preset coordinate system, and coordinates (for example, right_up_x, right_up_y) of an upper right corner of the dragged window in the preset coordinate system.

Further, as shown in FIG. 7, the window process information of the dragged window may further include information like a window identifier (for example, pid), a browser identifier (for example, parentId), and a path (for example, path). As shown in FIG. 7, in the process of dragging a window, for example, the monitoring module 410 may further obtain the window process information like the window identifier (for example, pid), the browser identifier (for example, parentId), and the path (for example, path) of the dragged window. The browser identifier may be used to: when a behavior of playing audio exists on a plurality of tab pages in a browser, filter out a tab page for playing the audio from the plurality of tab pages.

S603: When detecting that the video application window 501 crosses an edge of the display of the first device, the first device obtains an audio state corresponding to the video playing interface 502, and determines a first part and a second part of the video playing interface 502 based on a real-time position of the video application window 501.

In some embodiments, that the first device detects that the video application window 501 crosses the edge of the display of the first device means that a part of the video application window 501 crosses an edge of a display area corresponding to the display of the first device, and a part of the video application window 501 is displayed in a display area corresponding to a display of the second device. In the display area corresponding to the display of the second device, operations such as drawing and rendering are also performed on the first device. The display area may be a virtual display area set by the first device, that is, the display area is not displayed on the first device, but can be used for application drawing and rendering.

In this embodiment of this application, the audio state corresponding to the video playing interface 502 may include but is not limited to any one of the following: playing, pause, mute, exit, or the like.

In a scenario of synchronous playing of a video and audio, for example, in the scenario shown in FIG. 5A, if the video is being played but the audio is muted, the audio state is mute; if both the video and the audio are being played, the audio state is playing; if both the video and the audio are paused, the audio state is pause; and if both the video and the audio exit playing, the audio state is exit. For a scenario of playing only audio, for example, a scenario in which a music application plays music, mute means muting during playing, playing means music is being played, pause means pausing music playing, and exit means exiting music playing.

In this embodiment of this application, the first device may monitor, in real time by using the monitoring module 410, the audio state corresponding to the video playing interface 502, to update in real time, when the audio state changes, a state corresponding to an audio session.

Refer to FIG. 7. As shown in FIG. 7, the monitoring module 410 of the first device obtains an audio state corresponding to an interface in a dragged window by monitoring a session notification unit in real time, for example, playing (start), pause (pause/stop), mute (mute), and exit (exit) shown in FIG. 7.

For example, in this embodiment of this application, the monitoring module 410 maintains an audio session list. The audio session list includes session information of all audio sessions currently running on the first device.

As shown in FIG. 7, the monitoring module 410 of the first device maintains an audio session list (audio session list). The audio session list includes session information like a session window identifier (for example, pid), a session browser identifier (for example, parentId), a session state (for example, state), and a session path (for example, path). The session window identifier is an identifier of a window of the video playing interface 502 corresponding to an audio session. The session browser identifier is an identifier of a browser of the video playing interface 502 corresponding to an audio session. The session state includes an active state and an inactive state. For example, if an audio state is playing (start) and mute (mute), an audio session state is the active state. If an audio state is pause (pause/stop) or exit (exit), an audio session state is the inactive state. The session path is a file path corresponding to an audio session, for example, an application path. The session browser identifier may be used to: when audio is played on a plurality of tab pages in a browser, identify audio corresponding to a tab page dragged by a user.

In this embodiment of this application, if a plurality of audio sessions are simultaneously run on the first device, the audio session list includes session information of the plurality of audio sessions. In this case, the monitoring module

410 of the first device may associate the session information in the audio session list with obtained window process information, and determine a correspondence between a dragged window and the audio session, that is, determine an audio session corresponding to the dragged window.

For example, as shown in FIG. 7, if a session window identifier of an audio session in the audio session list is equal to a window identifier of a dragged window in window process information, or a browser identifier of an audio session in the audio session list is equal to a window identifier of a dragged window in window process information, or a browser identifier of an audio session in the audio session list is equal to a browser identifier of a dragged window in window process information, or a session path of an audio session in the audio session list is equal to a path of a dragged window in window process information, it may be determined that the audio session corresponds to the dragged window.

In this embodiment of this application, after determining the first part and the second part of the video playing interface 502, the monitoring module 410 of the first device may send information to the audio output control module 420, so that the audio output control module 420 further determines an extension mode, an extension proportion, and the like that are of extended display from the first device to the second device. This part of content is described in detail below.

The first part of the video playing interface 502 is displayed on the display of the first device, and the second part of the video playing interface 502 is displayed on the display of the second device. For example, for the extended display state shown in FIG. 5B, the first part of the video playing interface 502 may be a video playing interface 502-1 in FIG. 5B, and the second part of the video playing interface 502 may be a video playing interface 502-2 in FIG. 5B.

For example, the first device may calculate, based on a specific real-time position of the video application window 501 on the display of the first device, a specific size of the video playing interface 502 displayed across a device, and determine the first part and the second part of the video playing interface 502 based on the calculated size and with reference to a configuration parameter of the video playing interface 502. The configuration parameter of the video playing interface 502 may include but is not limited to controls (an icon, a text, and the like, and a specific display position, a size, and/or the like of each icon, text, and the like) displayed on the video playing interface 502. For details about the configuration parameter of an application interface, refer to a conventional technology. This is not limited in this application.

Figure 8:
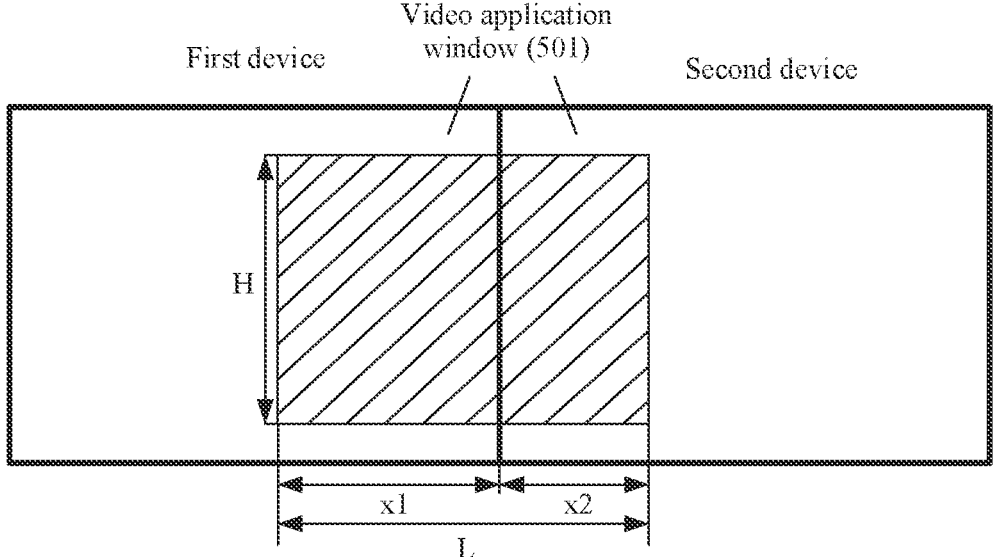
FIG. 8 is a schematic diagram of a method for determining a first part and a second part of an application interface according to an embodiment of this application.

As shown in FIG. 8, assuming that a width of the video application window 501 is L, a height is H. and a distance between a left edge of the video application window 501 and a right edge of the display of the first device is x1, a distance between a right edge of the video application window 501 and a left edge of the display of the second device may be calculated as x2, where x2=L−x1. After obtaining specific sizes x1 and x2 of the video playing interface 502 displayed across a device, the first device may split the video playing interface 502 into a first part and a second part with reference to a display position and a size of each icon, text, and the like on the video playing interface 502. The first part includes an interface configuration parameter in a range of x1×H on the video playing interface 502. The second part includes an interface configuration parameter in a range of x2×H on the video playing interface 502.

S604: The first device collects the audio data corresponding to the video playing interface 502.

In this embodiment of this application, the first device may collect, by using the virtual audio module 430 shown in FIG. 4, the audio data corresponding to the video playing interface 502.

For example, in this embodiment of this application, the first device may control, by using the audio output control module 420, the virtual audio module 430 to collect audio data corresponding to an interface (that is, the video playing interface 502) in an interface window (that is, the video application window 501) dragged by a user. For example, the audio output control module 420 may send a data collection instruction to the virtual audio module 430, where the data collection instruction carries a window identifier corresponding to the video application window 501, an interface identifier corresponding to the video playing interface 502, an application identifier corresponding to a video application, or the like, so that the virtual audio module 430 collects corresponding audio data based on the identifier.

Figure 9:
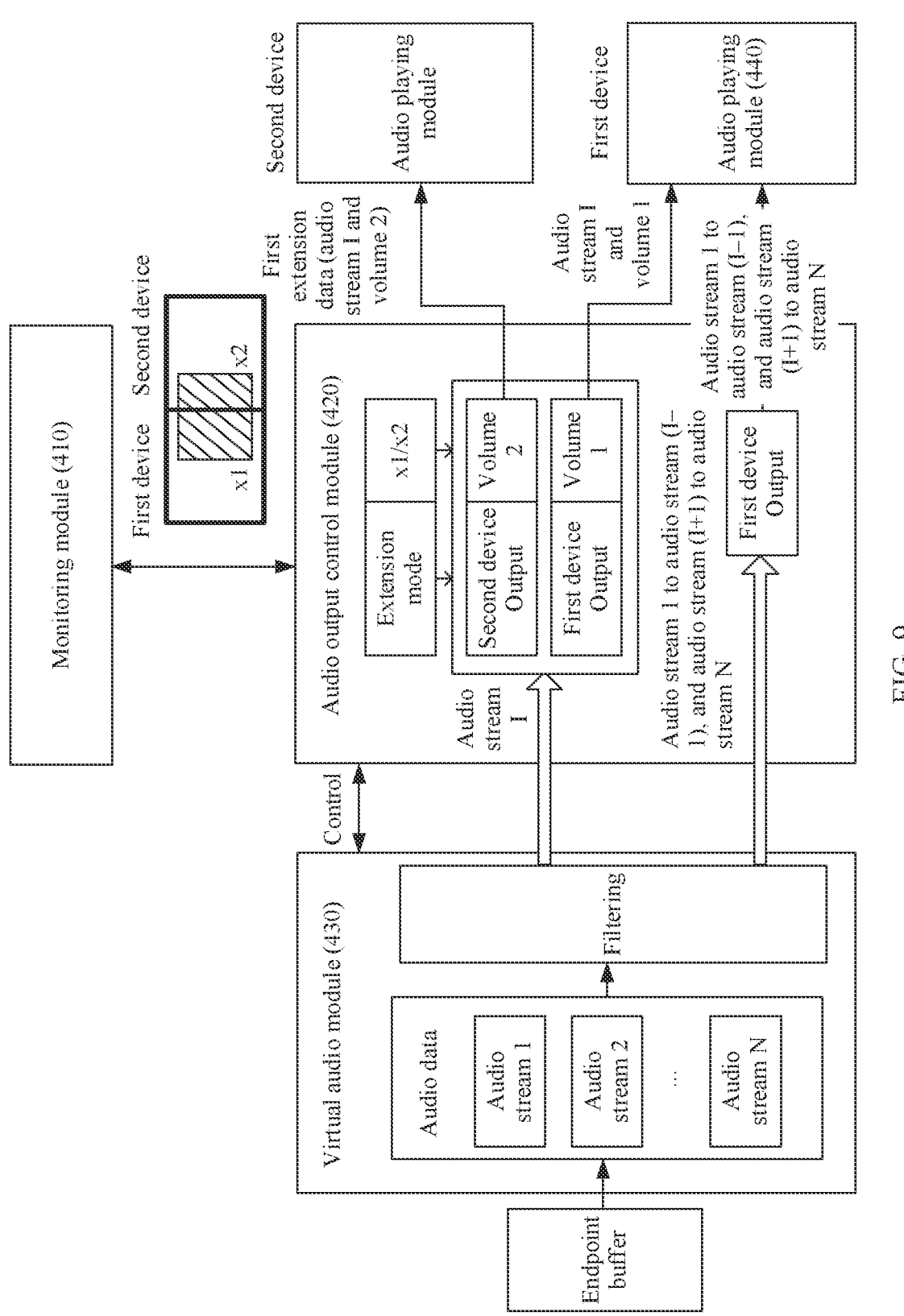
FIG. 9 is a logical block diagram 2 of an internal implementation of a first device in a distributed audio playing process according to an embodiment of this application.

It should be noted that the examples shown in FIG. 5A, FIG. 5B, and FIG. 5C in this application use an example in which an audio session (that is, an audio session corresponding to the video playing interface 502) of an application interface runs on the first device. Therefore, in step S604, the first device may collect, by using only the virtual audio module 430, the audio data corresponding to the video playing interface 502. In a case in which a plurality of audio sessions run on the first device, in step S604, the first device needs to collect, by using the virtual audio module 430, audio data corresponding to all application interfaces played on the first device. It is assumed that audio sessions corresponding to an application 1, an application 2, . . . , and an application N (where N is a positive integer, and N≥3) run on the first device. In this case, as shown in FIG. 9, audio data collected by the virtual audio module 430 of the first device is a mixed stream of an audio stream 1 (for example, a session 1), an audio stream 2 (for example, a session 2), . . . , and an audio stream N (for example, a session N). The audio stream 1 is audio data corresponding to the application 1, the audio stream 2 is audio data corresponding to the application 2, . . . , and the audio stream N is audio data corresponding to the application N. As shown in FIG. 9, the virtual audio module 430 may collect the audio data from an endpoint buffer.

For example, as shown in FIG. 9, in this embodiment of this application, the first device may control, by using the audio output control module 420, the virtual audio module 430 to filter out audio data (for example, an audio stream 1) corresponding to a dragged window from the mixed stream, and distribute and transmit the audio data to the audio output control module 420. For example, the audio output control module 420 may send, to the virtual audio module 430, a filtering instruction that carries session information of audio session corresponding to a dragged window, to instruct the virtual audio module 430 to filter audio data corresponding to the session information from the mixed stream. As shown in FIG. 9, the virtual audio module 430 transmits the audio stream I to the audio output control module 420 through a channel of signals, and transmits, to the audio output control module 420, the audio stream I to an audio stream (I−1) and an audio stream (I+1) to the audio stream N through another channel of signals.

S605: The first device sends first extension data to the second device based on the real-time position of the video application window 501. The first extension data includes first video data and first audio data.

The first video data is video data corresponding to the second part of the video playing interface 502, and the first audio data includes an audio stream corresponding to the video playing interface 502.

Further, in this embodiment of this application, the first audio data in the first extension data may further include volume (for example, volume 2) at which the second device plays the audio stream corresponding to the video playing interface 502, and is used to indicate the second device to play the second part of the video playing interface 502 at the volume 2.

In some embodiments of this application, the audio output control module 420 of the first device may determine, based on the first part and the second part that are of the video playing interface 502 and that are sent by the monitoring module 410, an extension mode of extended display from the first device to the second device. The extension mode may include left-right extension and up-down extension. The left-right extension is extension performed through horizontal movement, that is, an extension mode shown in FIG. 8. The up-down extension is extension performed through vertical movement.

It should be noted that, if the extension mode of extended display from the first device to the second device is the up-down extension, the monitoring module 410 needs to obtain a distance y1 between an upper edge of the video application window 501 and a lower edge of the display of the first device, and a distance y2 between a lower edge of the video application window 501 and an upper edge of the display of the second device, where y1+y2 is equal to the height H of the video application window 501. In this embodiment of this application, the left-right extension is used as an example. For a specific implementation process of the up-down extension, refer to the specific implementation process of the up-down extension.

For example, as shown in FIG. 9, when one part of the video playing interface 502 is on the first device and the other part is on the second device, x1>0, and x2>0, the first video data in the first extension data sent by the first device to the second device may specifically include an interface configuration parameter corresponding to the second part of the video playing interface 502, and the first audio data in the first extension data may specifically include an audio stream corresponding to the video playing interface 502 (the audio stream I shown in FIG. 9) and volume (the volume 2 shown in FIG. 9). The first extension data is used by the second device and the first device to display the video playing interface 502 through cross-device distribution in a splicing manner, and synchronously play audio corresponding to the video playing interface 502.

In this embodiment of this application, the first device may send the first extension data to an audio channel of the second device, to indicate the second device and the first device to display the video playing interface 502 through cross-device distribution in a splicing manner and synchronously play the audio corresponding to the video playing interface 502.

In some embodiments of this application, the volume 2 may be determined by the first device based on volume (for example, volume 1) at which the first device currently plays audio corresponding to the video playing interface 502. For example, the volume 2 is equal to the volume 1.

In some other embodiments of this application, the first device may further control, based on an extension proportion of extended display from the first device to the second device, the volume 1 and the volume 2 at which the first device and the second device respectively play audio corresponding to the video playing interface 502.

The audio output control module 420 of the first device may determine, based on the first part and the second part that are of the video playing interface 502 and that are sent by the monitoring module 410, the extension proportion of extended display from the first device to the second device. In this embodiment of this application, for the extension mode of the left-right extension shown in FIG. 8, an extension proportion is x1/x2. For the extension mode of the up-down extension, an extension proportion is y1/y2.

As shown in FIG. 9, the audio output control module 420 of the first device may obtain, based on the extension proportion of extended display from the first device to the second device, the volume 1 at which the first device plays the audio stream 1 and the volume 2 at which the second device plays the audio stream 1, where the volume 1/the volume 2=x1/x2. For example, it is assumed that in the state shown in FIG. 5A, the first device plays the video playing interface 502 at initial volume (for example, volume 0). In this case, the volume 1=the volume 0×x1/L, and the volume 2=the volume 0×x2/L, where L is a width of the video application window 501.

S606: The first device displays the first part of the video playing interface 502, the second device displays the second part of the video playing interface 502, and the first device and the second device synchronously play the audio corresponding to the video playing interface 502 in a distributed manner.

When the first device and the second device synchronously play the audio corresponding to the video playing interface 502 in a distributed manner, as shown in FIG. 5B, the first device plays the audio corresponding to the video playing interface 502 at the volume 1, and the second device plays the audio corresponding to the video playing interface 502 at the volume 2.

In some embodiments, the audio playing module 440 of the first device and an audio playing module of the second device may synchronously play the audio corresponding to the video playing interface 502 at same volume. That is, the volume 1 is equal to the volume 2.

In some other embodiments, as shown in FIG. 9, when x1>0 and x2>0, the audio playing module 440 of the first device and the audio playing module of the second device may synchronously play the audio corresponding to the video playing interface 502 respectively at the volume 1 and volume, where the volume 1/the volume 2=x1/x2. For example, the volume 1=the volume 0×x1/L, the volume 2=the volume 0×x2/L, where L is a width of the video application window 501, and the volume 0 is initial volume (for example, the volume 0) at which the first device plays the video playing interface 502 in the state shown in FIG. 5A.

Figure 10:
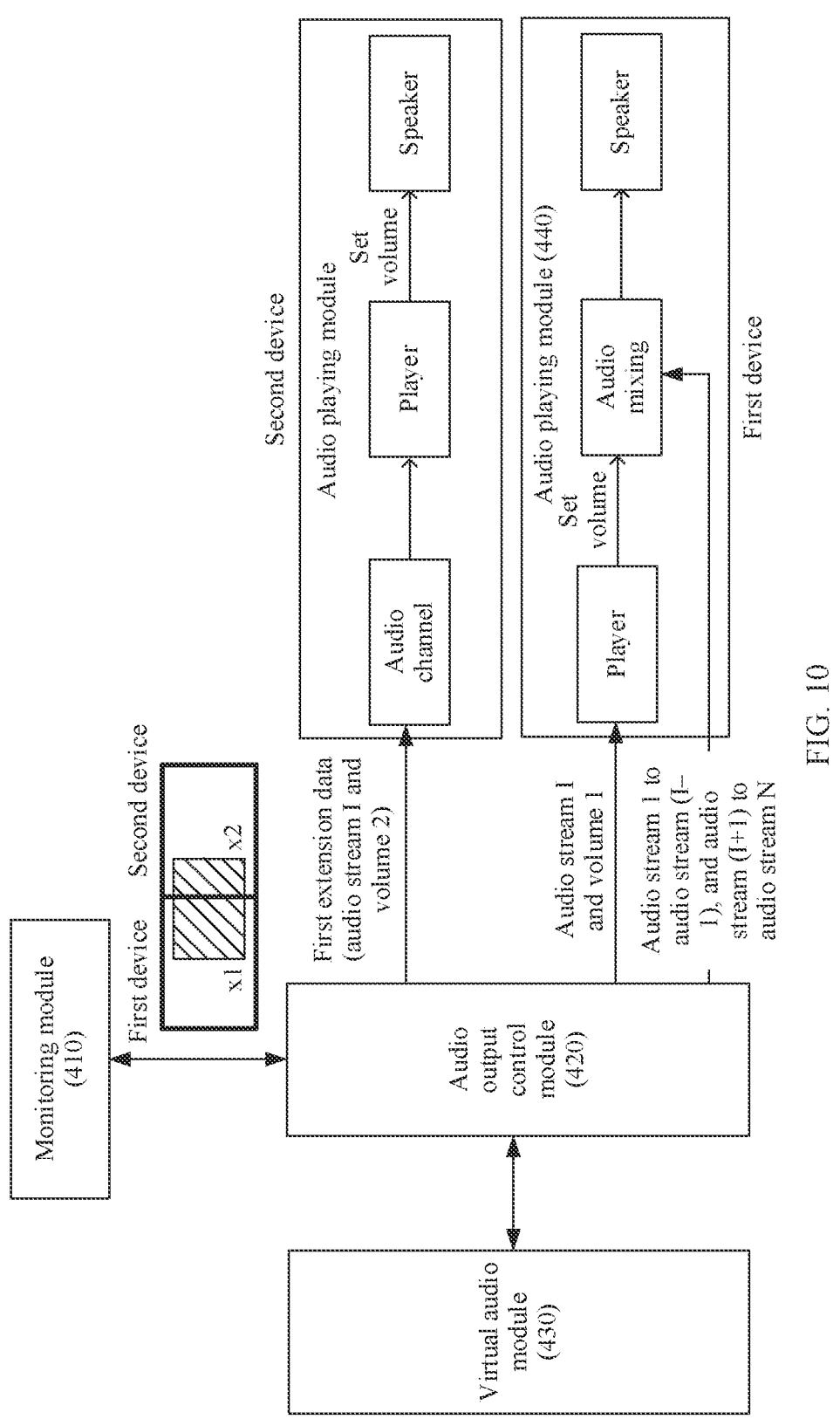
FIG. 10 is a logic block diagram 1 of an internal implementation of an audio playing module according to an embodiment of this application.

It should be noted that, in a case in which a plurality of audio sessions are run on the first device, for example, in a case in which audio sessions corresponding to an application 1, an application 2 . . . , and an application N (N is a positive integer, and N>3) run on the first device shown in FIG. 9, the audio playing module 440 of the first device needs to play the audio corresponding to the video playing interface 502 at the volume 1, and synchronously play audio corresponding to other audio sessions (that is, audio corresponding to the audio stream I to the audio stream (I−1) and audio corresponding to the audio stream (I+1) to the audio stream N shown in FIG. 9). In this case, as shown in FIG. 10, the audio channel of the second device sets, by using a player (for example, a player), the volume 2 at which the audio stream I is played, and then plays audio through a speaker. The audio playing module 440 of the first device sets, by using a player (for example, a player), the volume 1 at which the audio stream I is played, then performs audio mixing on the audio stream I of the volume, the audio stream 1 to the audio stream (I–1), and the audio stream (I+1) to the audio stream N. and plays audio streams after the audio mixing through a speaker.

Figure 11:
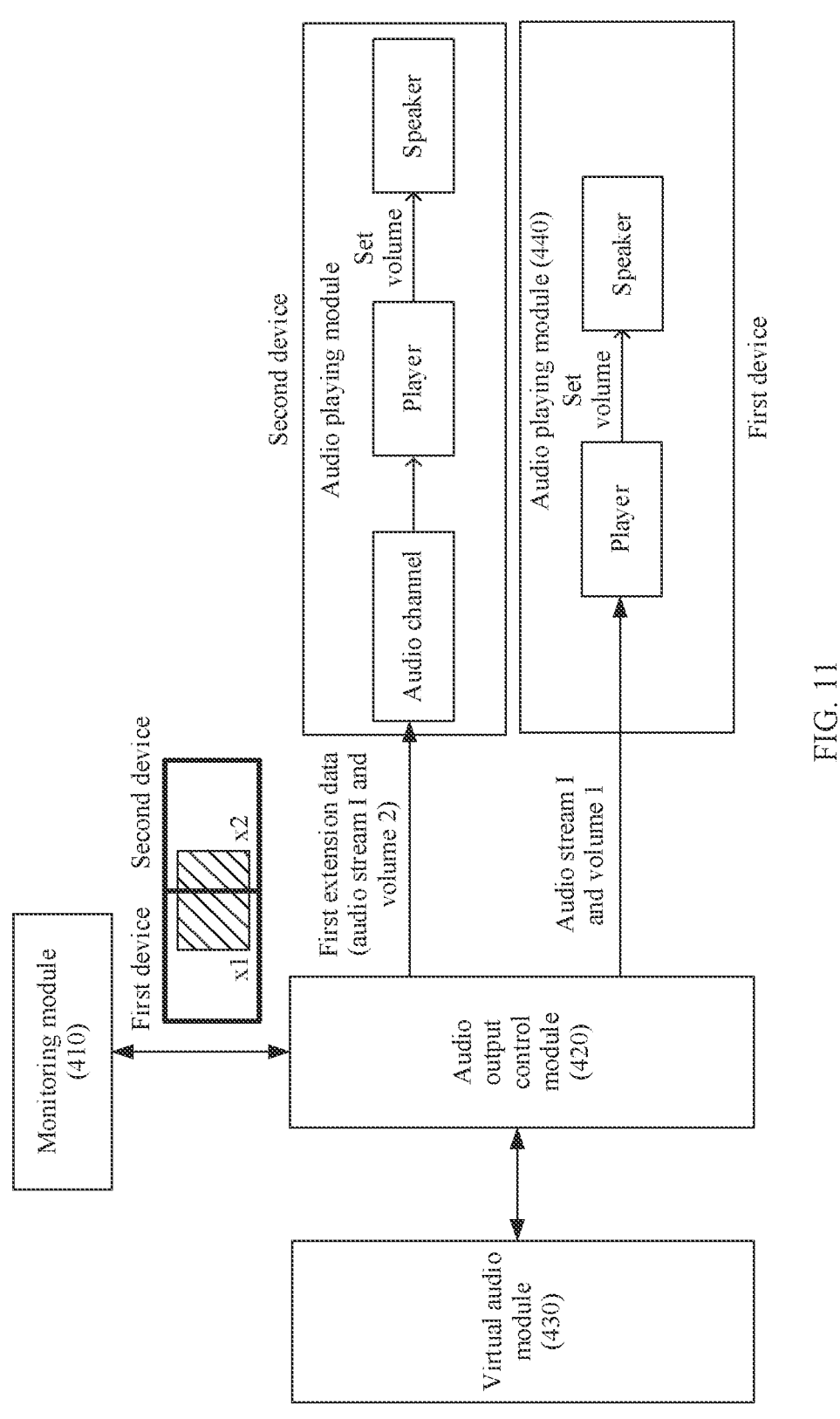
FIG. 11 is a logic block diagram 2 of an internal implementation of an audio playing module according to an embodiment of this application.

However, in a case in which an audio session (for example, an audio session corresponding to the video playing interface 502) runs on the first device, after determining an audio stream (an audio stream I shown in FIG. 11) corresponding to an audio session that is obtained by the virtual audio module 430 through filtering, the audio output control module 420 of the first device indicates the audio playing module 440 of the first device and the audio playing module of the second device to play the audio corresponding to the video playing interface 502 respectively at the volume 1 and volume 2. In this case, as shown in FIG. 11, the audio channel of the second device sets, by using a player (for example, a player), the volume 2 at which the audio stream I is played, and then plays audio through a speaker. The audio playing module 440 of the first device sets, by using a player (for example, a player), the volume 1 at which the audio stream I is played, and then directly plays audio through a speaker.

Further, as the user continues to drag the video application window 501, when the video application window 501 changes from the state shown in FIG. 5B to the state shown in FIG. 5C, as shown in FIG. 6A and FIG. 6B, the distributed audio playing method provided in this embodiment of this application may further include the following steps S607 and S608.

S607: The first device sends second extension data to the second device when detecting that the video application window 501 is dragged out of the edge of the display of the first device. The second extension data includes second video data and second audio data.

When the video application window 501 changes from the state shown in FIG. 5B to the state shown in FIG. 5C, the first device completely transfers audio corresponding to the video application window 501 and the video playing interface 502 to the second device. The second video data is video data corresponding to the video playing interface 502, and the second audio data includes an audio stream corresponding to the video playing interface 502.

Further, in this embodiment of this application, the second audio data in the second extension data may further include volume (for example, volume 3) at which the second device plays the audio stream corresponding to the video playing interface 502, and is used to indicate the second device to play the video playing interface 502 at the volume 2.

In this embodiment of this application, the first device may send the second extension data to the audio channel of the second device, to indicate the second device to display the video playing interface 502 and synchronously play the audio corresponding to the video playing interface 502.

S608: The second device displays the video application window 501, and plays the audio corresponding to the video playing interface 502 displayed in the video application window 501.

In some embodiments, the second device may play the audio corresponding to the video playing interface 502 at default volume. For example, the default volume is volume currently set by the audio playing module of the second device.

In some other embodiments, as shown in FIG. 5C, FIG. 6A, and FIG. 6B, the second device may play the audio corresponding to the video playing interface 502 at the volume 3. The volume 3 is equal to the volume 0, and the volume 0 is initial volume at which the first device plays the video playing interface 502 in the state shown in FIG. 5A.

For example, the audio channel of the second device may set, by using the player (for example, the player), the volume 3 at which the audio stream I is played, and then play audio through the speaker.

According to the distributed audio playing method provided in this embodiment of this application, in a process in which an interface including audio is displayed from the first device to the second device in an extended manner, the audio can be automatically adaptively switched based on a distributed display status of the interface. For example, when a user has not dragged an interface window or has not dragged the interface window out of a range of the display of the first device, only the first device plays audio corresponding to an interface. When the user drags the interface window to a state in which one part of the interface window is displayed in the range of the display of the first device and the other part is displayed in a range of the display of the second device, the audio corresponding to the interface is synchronously played in a distributed manner. When the user completely drags the interface window to the range of the display of the second device, only the second device plays the audio corresponding to the interface. According to the foregoing method, audio setting operations performed by the user during extended display can be reduced, and user experience can be improved.

Further, in some embodiments, when the user drags the interface window to a state in which a first part is displayed in the range of the display of the first device and a second part is displayed in the range of the display of the second device, the first device may further control respective volume at which the first device and the second device synchronously play the audio corresponding to the interface. For example, as the interface window moves, the first device and the second device are controlled, based on a specific proportion of the first part and the second part, to gradually change the volume at which the audio corresponding to the interface is played synchronously. For example, as the interface window is displayed from the first device to the second device in an extended manner, volume of the first device becomes lower, and volume of the second device becomes higher. In this manner, a volume change can be automatically adapted to a change of interface extension. This provides better user experience.

In some embodiments of this application, a channel between the first device and the second device may be a channel for transmitting audio, a video, control signaling, a parameter, and the like. To be specific, all interaction data is exchanged through the channel, and all the interaction data needs to meet a data format of the channel. Alternatively, the channel between the first device and the second device may be a plurality of channels respectively for transmitting one or more of audio, a video, control signaling, a parameter, and the like.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A method comprising:

displaying, by a first device, a first application window of a first application;

playing, by the first device, first audio corresponding to the first application window;

in response to a first user operation on the first application window:

displaying, by the first device, a first part of the first application window on the first device;

obtaining, by the first device, a first volume and a second volume based on a position of the first application window;

sending, by the first device, first video data of the first application according to the first user operation;

receiving, by a second device, the first video data from the first device;

displaying, by the second device, a second part of the first application window on the second device, based on the first video data;

playing, by the first device, the first audio at the first volume; and playing, by the second device, the first audio at the second volume; and in response to a second user operation on the first application window:

sending, by the first device, second video data of the first application window; and receiving, by the second device, the second video data;

displaying, by the second device, the first application window based on the second video data; and playing, by the second device, the first audio.

2. The method of claim 1, further comprising:

monitoring, by the first device, the position of the first application window in a first display area of the first device; and determining, by the first device and based on the position, whether to send the first video data or the second video data to the second device, wherein the determining based on the position comprises:

skipping sending the first video data and the second video data to the second device when the first application window is in the first display area of the first device; and sending the first video data to the second device when the first part is in the first display area and the second part is in a second display area of the second device, or sending the second video data when the first application window is in the second display area.

3. The method of claim 1, further comprising:

sending, by the first device, the first audio to the second device when an audio state of the first application window is playing; and skipping sending the first audio to the second device when the audio state is at least one of pause, mute, or exit.

4. The method of claim 1, further comprising:

obtaining, by the first device and from an audio session list, an audio stream based on an identifier of the first application window; and generating, by the first device, the first audio based on the audio stream.

5. The method of claim 4, wherein the identifier of the first application window comprises at least one of a window identifier, a browser identifier, or a path.

6. The method of claim 1, further comprising running, by the first device, a first application corresponding to the first application window.

7. The method of claim 1, wherein the first user operation and the second user operation comprises dragging the first application window.

8. The method of claim 1, wherein obtaining the first volume and the second volume based on the position of the first application window further comprises setting the first volume and the second volume based on a volume ratio of the first volume to the second volume, wherein the volume ratio is equal to a position ratio of the first part to the second part of the first application window.

9. The method of claim 8, wherein the first user operation and the second user operation comprises dragging the first application window, and wherein the method further comprises continuously adjusting the volume ratio based on the dragging of the first application window.

10. A first device, comprising:

a memory configured to store instructions; and one or more processors coupled to the memory and configured to execute the instructions to cause the first device to:

display a first application window of a first application;

play first audio corresponding to the first application window;

in response to a first user operation on the first application window:

display a first part of the first application window on the first device;

obtain a first volume and a second volume based on a position of the first application window;

play the first audio at the first volume;

send, to a second device, first data of the first application according to the first user operation, wherein the first data instructs the second device to display a second part of the first application window on the second device, and instructs the second device to play the first audio at the second volume while the first device continues to play the first audio; and in response to a second user operation on the first application window:

send, to the second device, second data of the first application window, wherein the second data instructs the second device to display the first application window and play the first audio; and stop playing the first audio.

11. The first device of claim 10, wherein the first device is a laptop computer, and the second device is a tablet computer.

12. The first device of claim 10, wherein the instructions further cause the first device to:

monitor the position of the first application window in a first display area of the first device; and determine, based on the position, whether to send the first data or the second data to the second device, wherein the determining based on the position comprises:

skipping sending the first data and the second data to the second device when the first application window is in the first display area of the first device; and sending the first data when the first part is in the first display area and the second part is in a second display area of the second device, or sending the second data when the first application window is in the second display area.

13. The first device of claim 10, wherein the instructions further cause the first device to:

send the first audio to the second device when an audio state of the first application window is playing; and skip sending the first audio to the second device when the audio state is at least one of states comprising pause, mute, and exit.

14. The first device of claim 10, wherein the instructions further cause the first device to:

obtain, from an audio session list, an audio stream based on an identifier of the first application window; and generate, by the first device, the first audio based on the audio stream.

15. The first device of claim 14, wherein the identifier of the first application window comprises at least one of a window identifier, a browser identifier, and a path.

16. The first device of claim 10, wherein the first user operation and the second user operation comprises dragging the first application window.

17. The first device of claim 10, wherein the instructions further cause the first device to obtain the first volume and the second volume based on the position of the first application window by setting the first volume and the second volume based on a volume ratio of the first volume to the second volume, wherein the volume ratio is equal to a position ratio of the first part to the second part of the first application window.

18. The first device of claim 17, wherein the first user operation and the second user operation comprises dragging the first application window, and wherein the instructions further cause the first device to continuously adjust the volume ratio based on the dragging of the first application window.

19. A second device, comprising:

a memory configured to store instructions; and one or more processors coupled to the memory and configured to execute the instructions to cause the second device to:

receive, from a first device, first video data of a first application window based on a first user operation;

receive, from the first device, volume instructions to play first audio corresponding to the first application window at a set volume, wherein the set volume is based on a position of the first application window on the first device;

display a second part of the first application window on the second device, based on the first video data, wherein the first application window comprises a first part on the first device;

play the first audio at the set volume;

receive, from the first device, second video data of the first application window based on a second user operation;

display, based on the second video data, the first application window including the first part and the second part; and play the first audio without the first device.

20. The second device of claim 19, wherein the set volume is a different volume than a played volume of the first device.

* * * * *